Oct. 23, 1951     I. D. WALLACH ET AL     2,572,684
AUTOMATIC RECORD CHANGER
Filed April 10, 1948     11 Sheets-Sheet 3
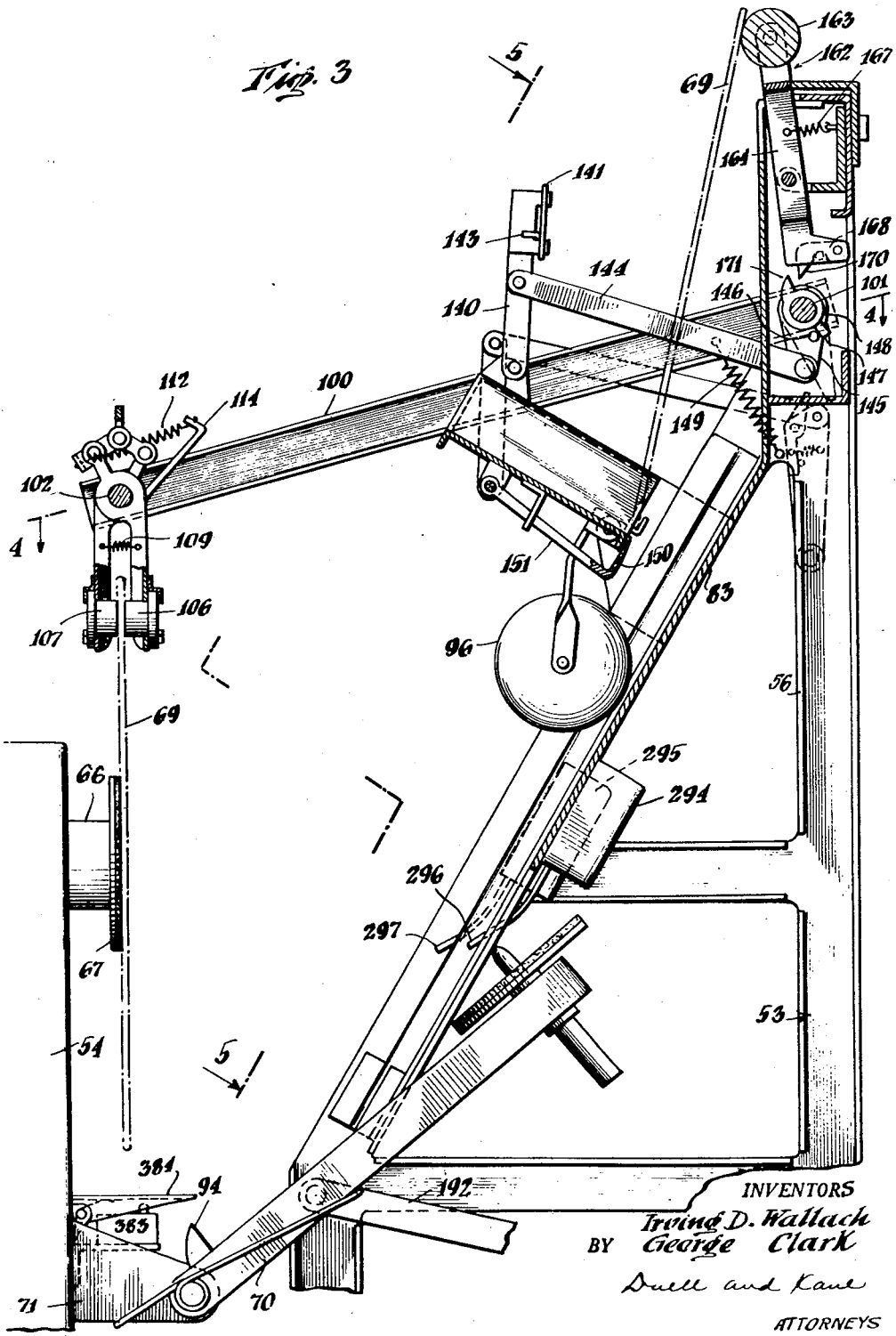
INVENTORS
Irving D. Wallach
BY George Clark
Duell and Kane
ATTORNEYS Oct. 23, 1951  I. D. WALLACH ET AL  2,572,684
AUTOMATIC RECORD CHANGER
Filed April 10, 1948                                          11 Sheets-Sheet 4
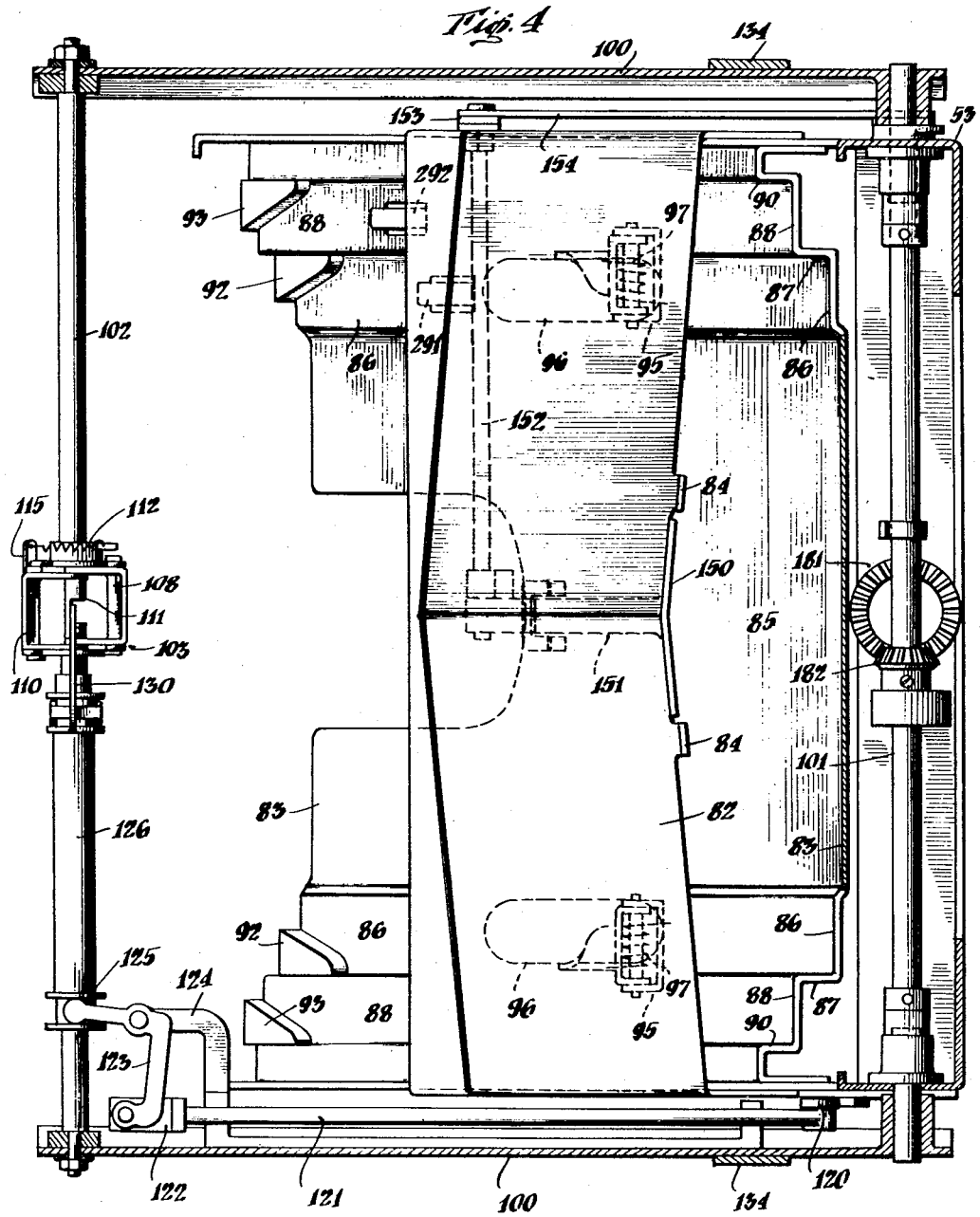
INVENTORS
Irving D. Wallach
George Clark
BY
Duell and Kane
ATTORNEYS

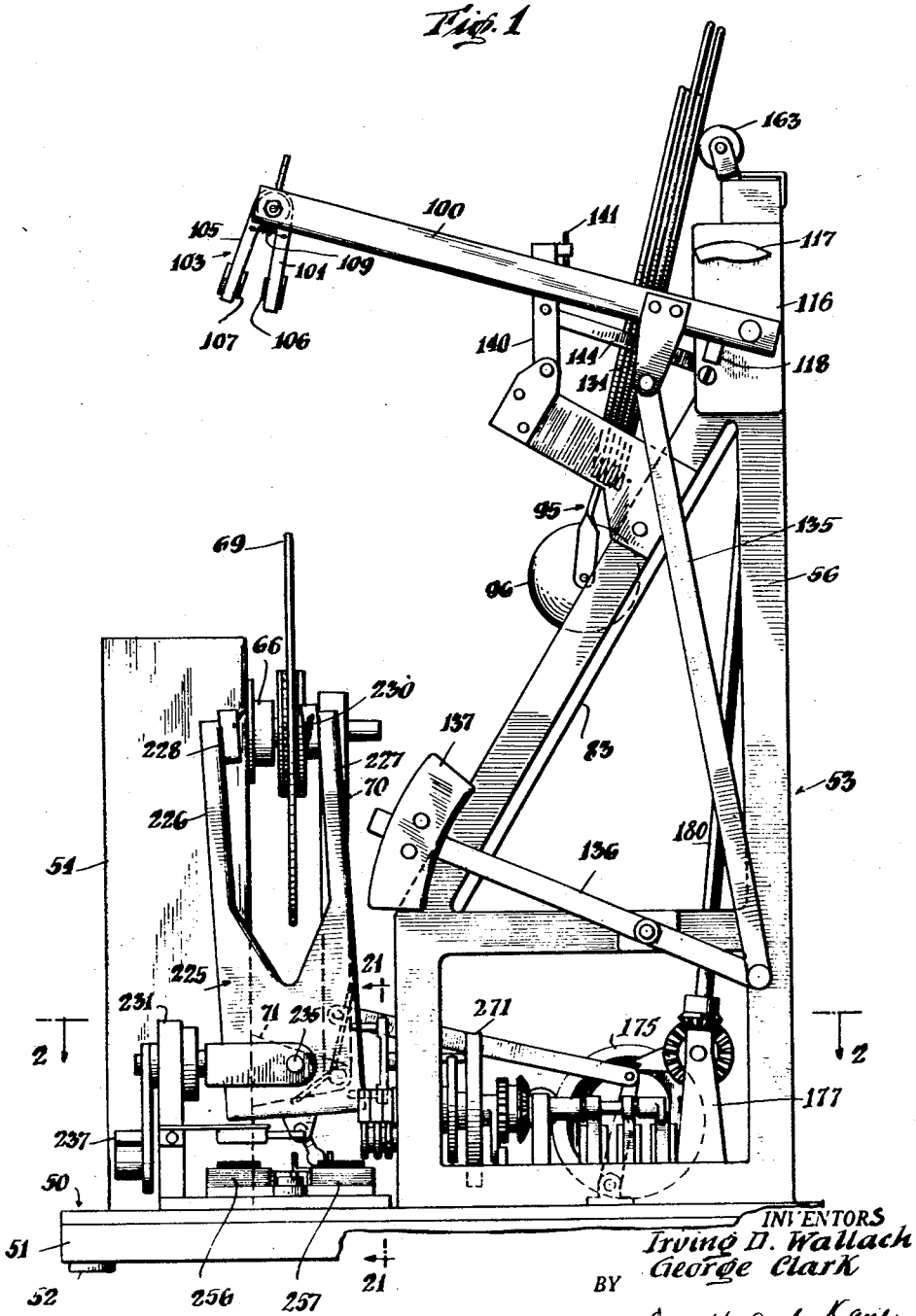

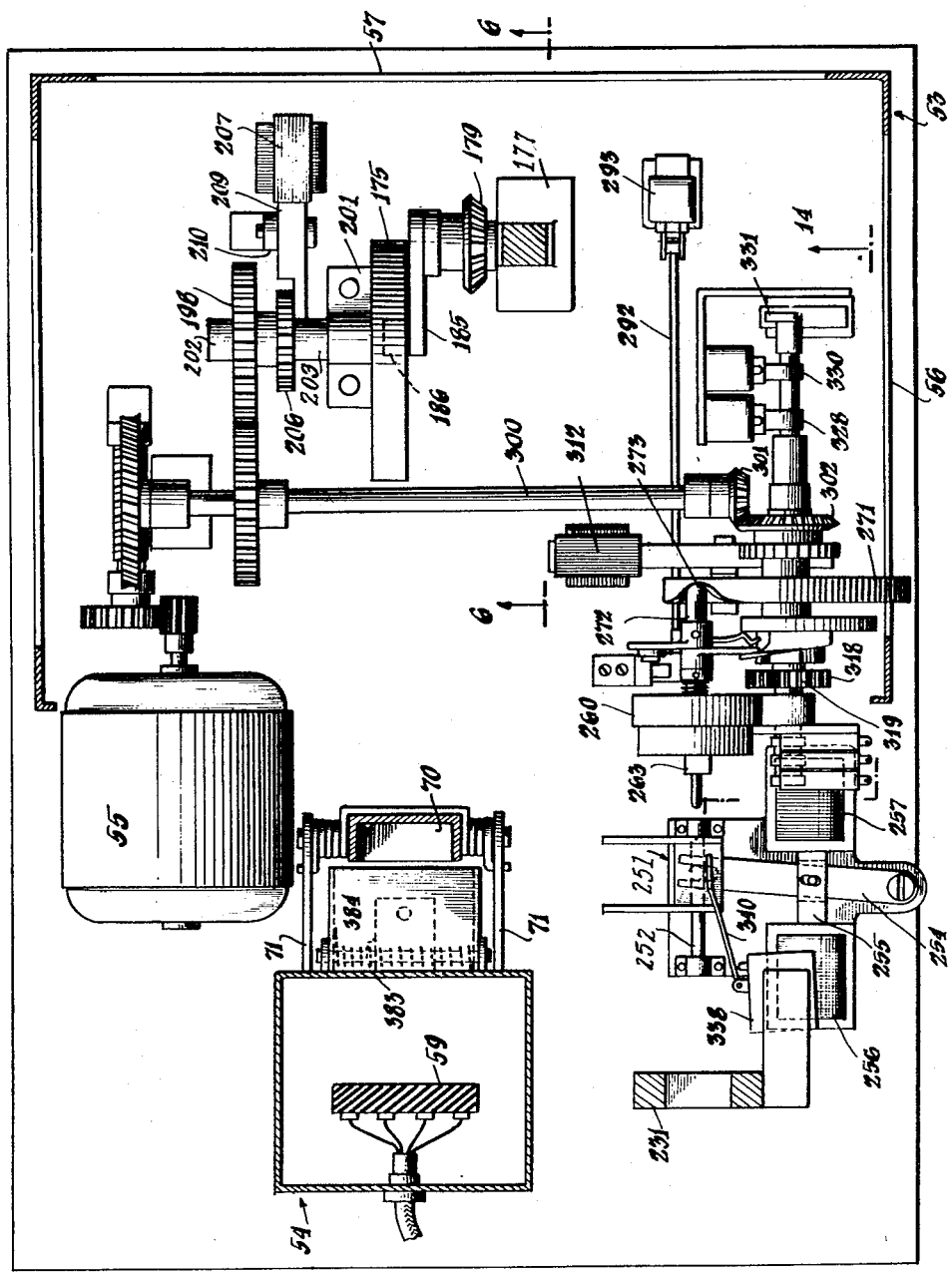

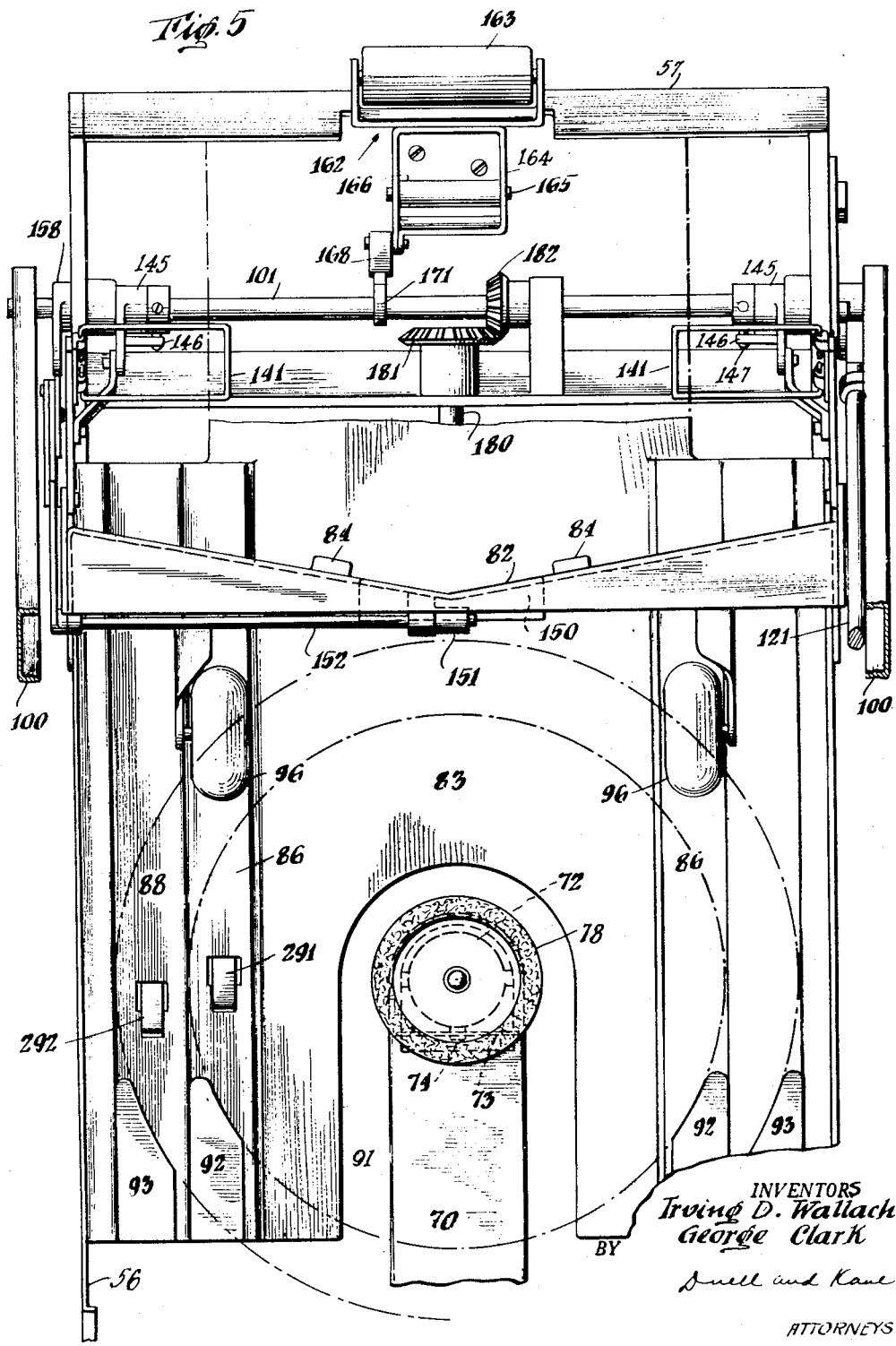

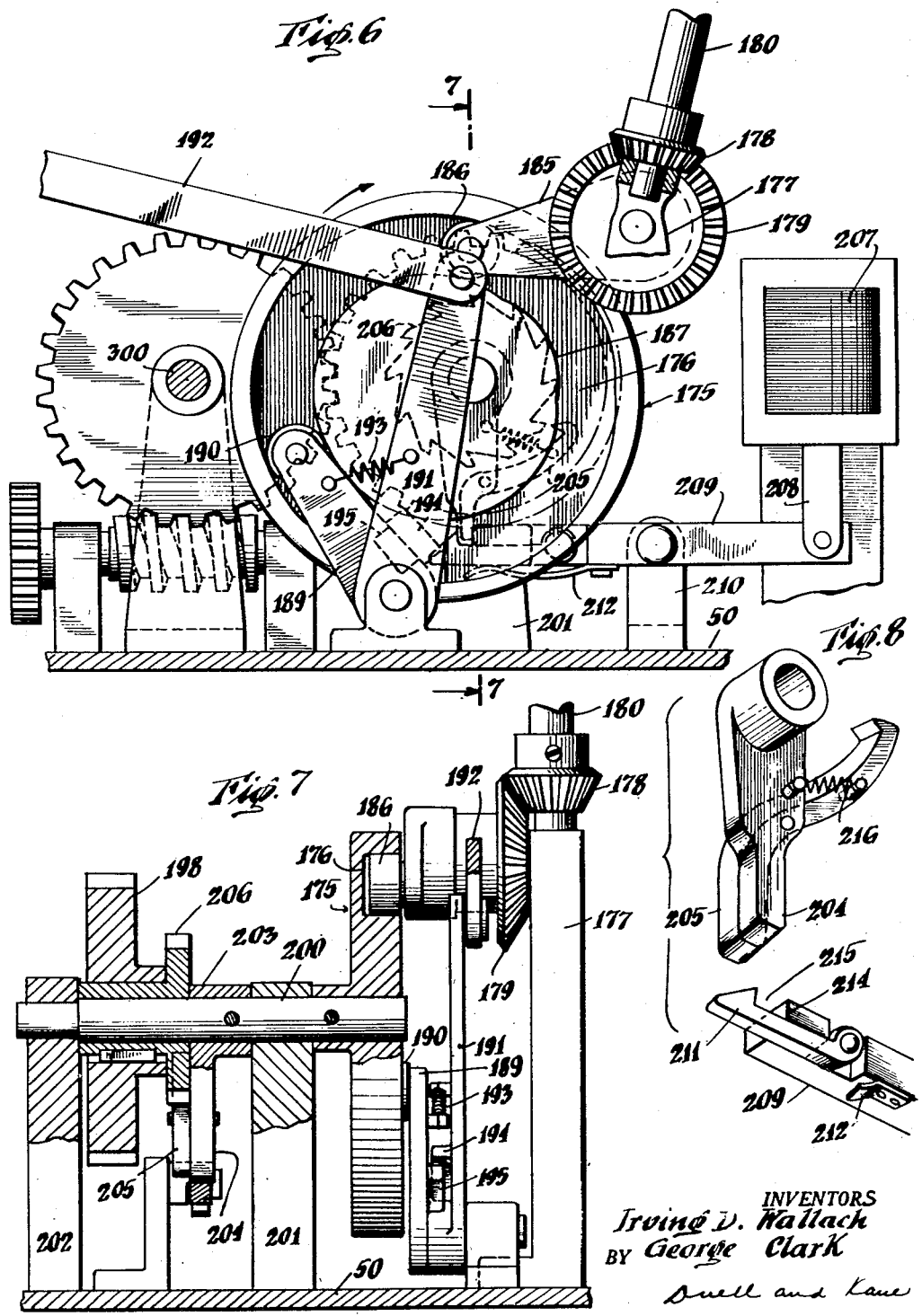

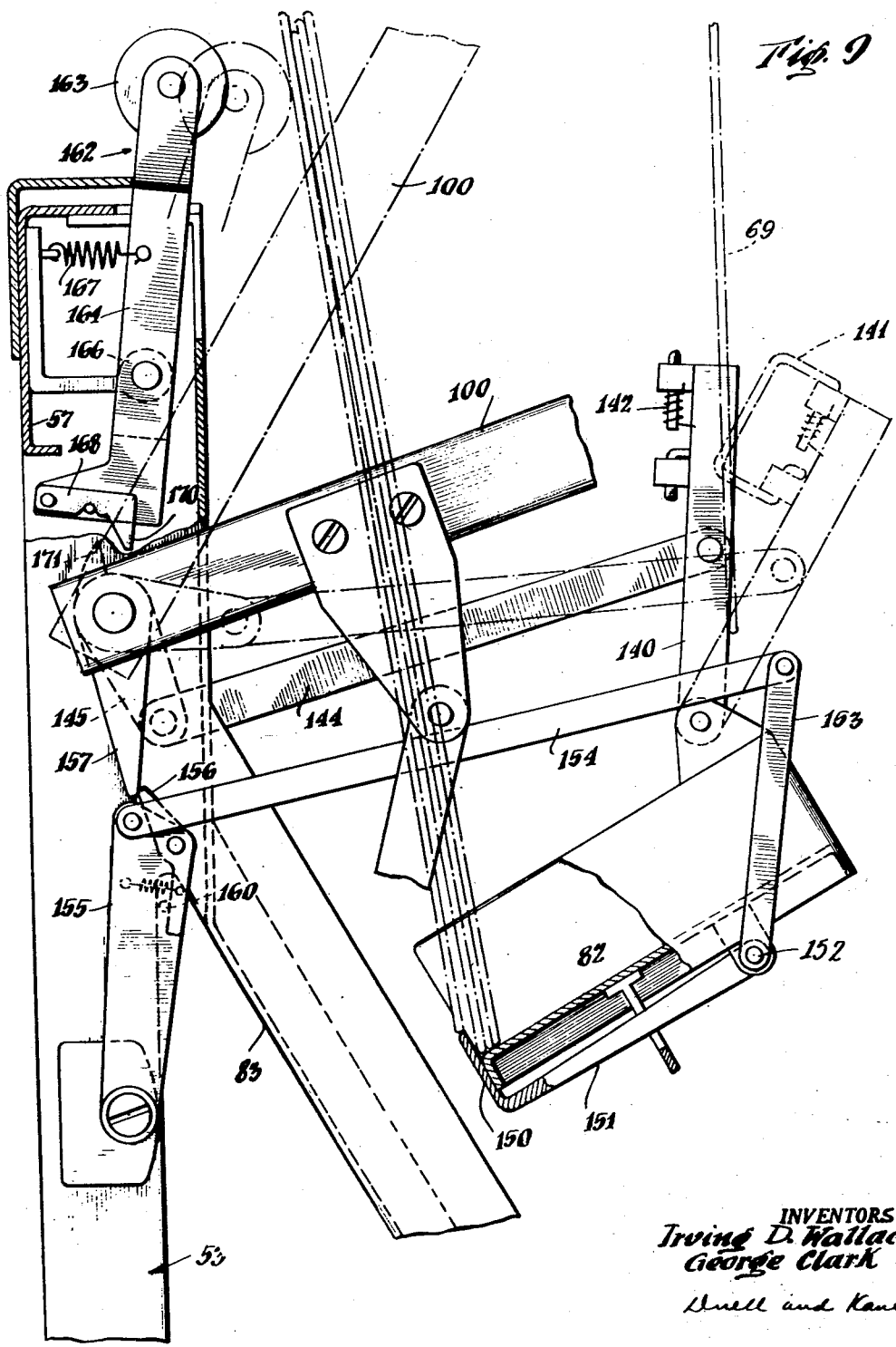

Oct. 23, 1951     I. D. WALLACH ET AL     2,572,684
AUTOMATIC RECORD CHANGER
Filed April 10, 1948     11 Sheets-Sheet 8
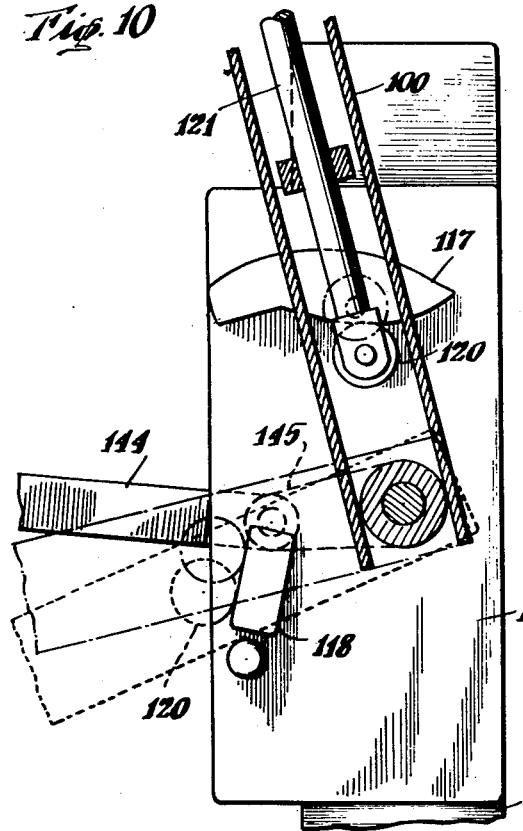
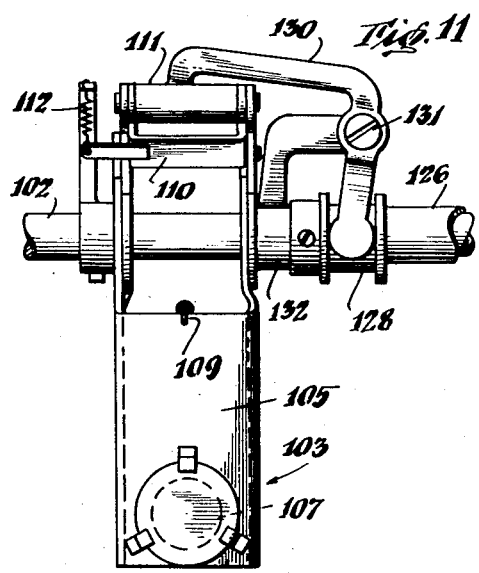
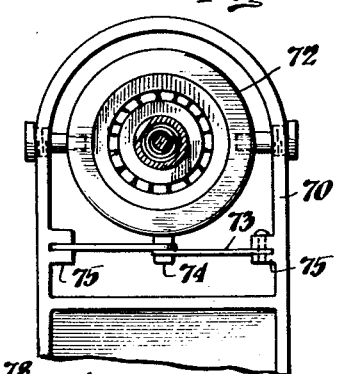
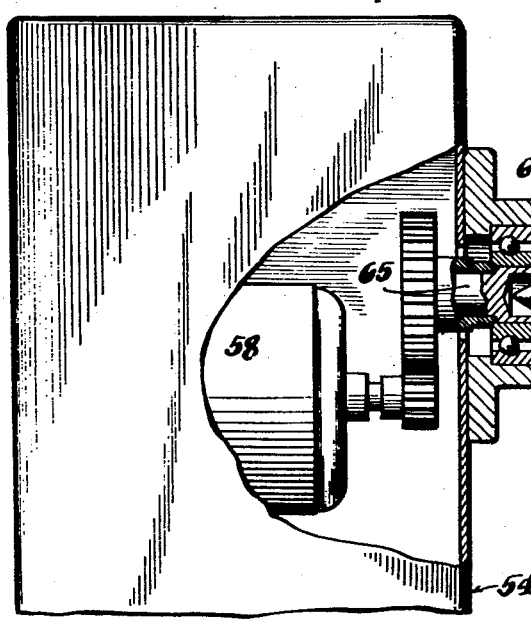
INVENTORS
Irving D. Wallach
George Clark
BY
Snell and Kane
ATTORNEYS

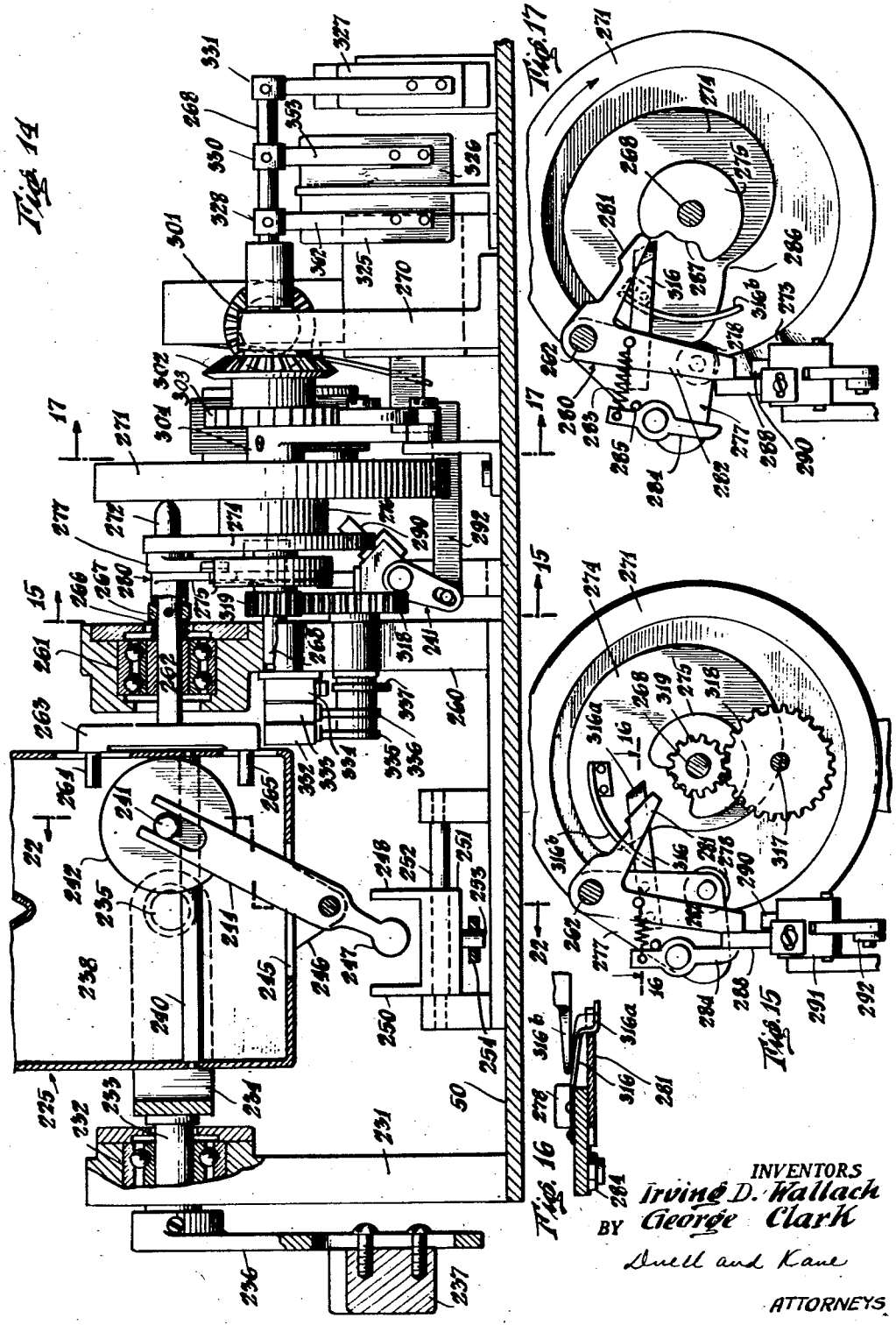

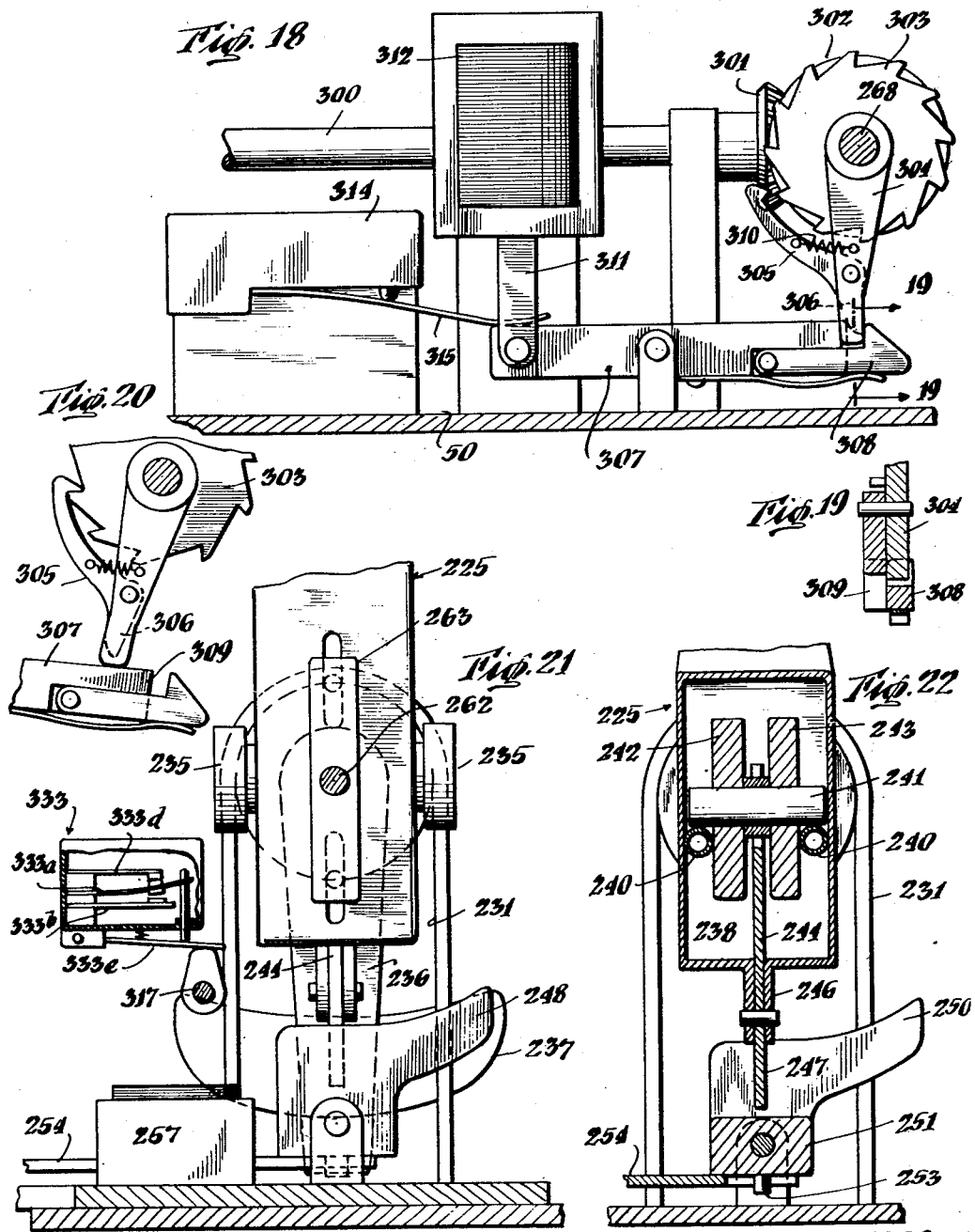

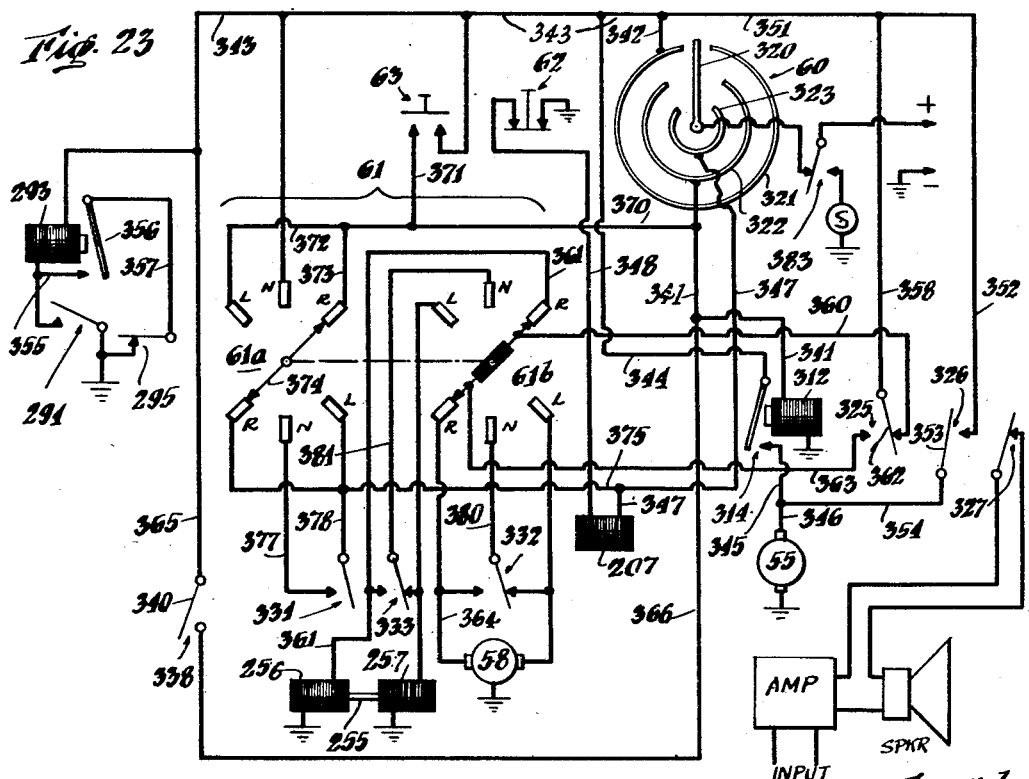
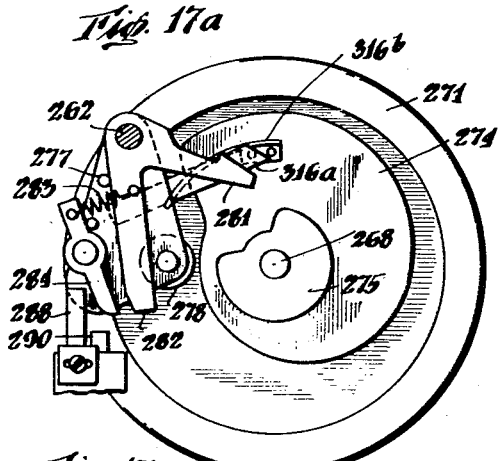
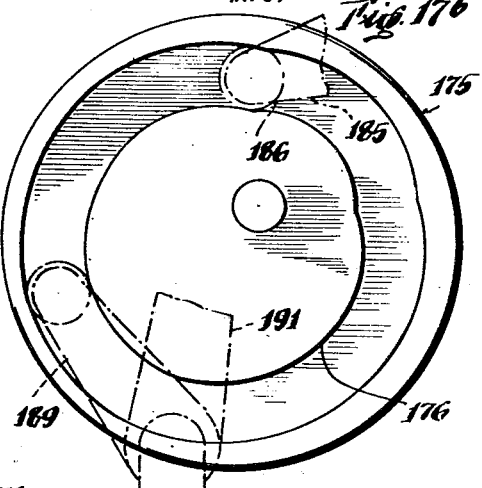
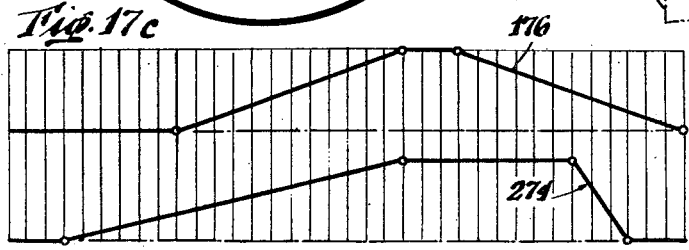

Patented Oct. 23, 1951

2,572,684

UNITED STATES PATENT OFFICE 2,572,684

AUTOMATIC RECORD CHANGER

Irving D. Wallach, Port Washington, and George Clark, New York, N. Y., assignors to Associated Development & Research Corporation, New York, N. Y., a corporation of New York Application April 10, 1948, Serial No. 20,248

13 Claims. (Cl. 274—10)

This invention relates to an improved means for automatically playing phonograph records, and particularly to improved means whereby a plurality of records may be played in certain optional sequences, or a single record may be played repetitively.

So-termed "automatic record players" are common. Generally, however, such record players require the stacking of the plurality of records on the spindle of a horizontal turntable, and the records drop successively upon the turntable by means automatically actuated at the completion of the playing of one face of the previously deposited record. In these conventional record players, the increasing weight of records deposited on the turntable imposes a cumulative strain on the drive motor which may slow the speed of the motor so that the last of the records in the group will not be played at proper speed. The records must be carefully stacked in relationship to the feeding means, and a record which is even slightly warped may jam the feeding device, and cause operational failure or breakage of the record.

In the horizontal turntable types of record players the weight of the tone arm and the side pressure of the needle in the groove are factors which accentuate record wear. Accordingly, horizontal tone arms must be carefully counterbalanced and positioned to reduce as much as possible the wearing effect of the needle.

It is therefore a principal object of the present invention to provide an automatic record player which eliminates, or minimizes, these and other defects and disadvantages of conventional record players and has advantageous features and operational characteristics not attainable with present equipment.

It is an object of the present invention to provide an automatic record player in which the record is mounted for rotation in a vertical plane, and in which the records are fed individually to playing position from a magazine, and are returned to the magazine after playing so that at no time is there more than one record carried by the turntable.

It is an object of the invention to provide a record player in which may be loaded a large number of records—for example, as many as twenty-four records of ten inch or twelve inch size, or an indiscriminate mixture thereof, but in which each record is automatically individually handled, thereby keeping operational loads on the machine at a uniform and minimum level.

It is another object of the invention to provide an automatic record player in which each side of each record may be played in succession, one side of each successive record may be played, or any one record may be repeatedly played according to the selection or option of the operator.

It is an object of the invention to provide a record player having a full-floating tone arm to minimize the wear in the tracking groove and to make needle pressure within the groove independent of tone arm weight.

It is a further object of the invention to provide a record player in which the magazine may be loaded from above by simply stacking the records within a compartment or chamber from which they are later fed.

It is another object of the invention to provide a record player having improved means for conveying the records to playing position and returning the played record to the magazine.

It is an object of the invention to provide a record player in which warped records will be handled satisfactorily.

It is still another object of the invention to provide a record player in which speaker operation is automatically cut out at the end of one play and is not cut in until the needle has come into playing position on the next successive record or record face, thereby preventing any electrical noises incidental to the change-over from one record to the next from appearing as speaker noises.

It is an object of the invention to provide an automatic record player in which ten inch and twelve inch records may be indiscriminately intermixed, and having improved means for accurately positioning the tone arm needle in playing position.

It is a still further object of the invention to provide an automatic record player in which all moving structures concerned with the handling of the records are spring balanced or resiliently mounted so as to minimize the possibility of damage thereto.

Other features and advantages will be hereinafter described.

In the accompanying drawings:

Fig. 1 is a side elevation of the device showing a record being played and the record pick-up arm at "ready";

Fig. 2 is a plan view in partial section on lines 2—2 of Fig. 1;

Fig. 3 is a vertical sectional elevation of the record magazine showing the pick-up arm in engagement with a record to be returned to the magazine;

Fig. 4 is a top plan view, partly in section, of the record magazine;

Fig. 5 is a front elevation of the magazine and record chute in section on lines 5—5 of Fig. 3;

Fig. 6 is a side elevation of the pick-up arm and record support arm cam taken on lines 6—6 of Fig. 2;

Fig. 7 is a vertical elevation taken on lines 7—7 of Fig. 6;

Fig. 8 is an exploded perspective of the drive pawl for the cam of Fig. 6 and the release means thereof;

Fig. 9 is a side elevation of the record magazine release means, partly in section, and shown at the instant of release of a record into the magazine chute;

Fig. 10 is a side elevation, partly in section, showing the record pick-up clamp actuating cams;

Fig. 11 is a front elevation of the record pick-up clamp, said clamp being illustrated in closed position;

Fig. 12 is a side sectional elevation of the record support arm spindle, the drive plate shaft and the driving and support discs;

Fig. 13 is a vertical elevation taken from the rear of the record support arm and in section on lines 13—13 of Fig. 12;

Fig. 14 is a side elevation of the tone arm position and support mechanism, in section on lines 14—14 of Fig. 2;

Fig. 15 is a side elevation of the tone arm positioning cams at the stage when the tone arm has been positioned for a twelve inch record, but prior to the release of the tone arm to drop on the record;

Fig. 16 is a sectional on lines 16—16 of Fig. 15 illustrating the latch for holding the tone arm against accidental movement when established for proper engagement with a record of either ten or twelve inch size;

Fig. 17 is a view similar to Fig. 16 showing the operational position of the actuating cams when the tone arm is swung outwardly to the maximum after a record has been played;

Fig. 17a is a side elevation of the tone arm cams and followers at the commencement of play of a record;

Fig. 17b is a side elevation of the pick-up arm cam and followers in the "rest" position;

Fig. 17c is an operational chart of the pick-up arm cam and the tone arm cam;

Fig. 18 is a side elevation, partly in section, of the clutch dog for the tone arm cam and the solenoid actuated latch thereof;

Fig. 19 is an end section of the clutch dog taken in section on lines 19—19 of Fig. 18;

Fig. 20 is a view similar to Fig. 18 but showing the clutch dog engaged and at the commencement of rotation;

Fig. 21 is an elevational section on lines 21—21 of Fig. 1;

Fig. 22 is a vertical section showing the interior of the base chamber and the tone arm and the counterbalance means therein; and Fig. 23 is a schematic wiring diagram.

Referring now to the drawings for a more complete description of the invention as presently constructed, a base plate 50, which is advantageously a rigid cover for a rectangular wiring chamber frame 51 supported on suitable vibration isolator feet 52 carries the framework 53, the turntable standard 54, the operation motor 55, the tone arm assembly, and the several operational cam and linkage assemblies which function as later described.

The frame work comprises the rigidly braced side frames 56 and rear frame 57 which are advantageously formed from flanged aluminum shapes, riveted or welded according to preference.

The drive motor standard may be a hollow rectangular structure within which is the record drive motor 58 and a connection block or equivalent 59 to which the various control circuits may be wired as later described. It is understood that the apparatus is intended for installation within the cabinet of a radio-phonograph combination or the like and the respective control switches 60, 61, 62, 63 shown in the wiring diagram (Fig. 23) will be conveniently grouped on an accessible control panel.

The record drive motor 58 is reversible and governor controlled for constant speed. Through suitable gearing the motor drives a shaft 65, which is rigidly mounted in ball bearings or equivalent supported in a fixed housing 66 secured to the standard 54. The end of the shaft 65 is tubular, as shown in Fig. 12, and affixed to said tubular end is the turntable disc 67 having a resilient facing 68. The diameter of the turntable disc is less than that of the "label area"—that is, the ungrooved central portion of the record—at which the label is affixed. Said central areas have been standardized by record manufacturers and there is no danger that the turntable disc will encroach upon the playing surface of the record.

A record support arm 70 is pivotally mounted relative to the standard 54 as on a bracket 71 at the base thereof, and is adjustably spring biased for rotation toward said standard. The support arm carries at its free end a bearing housing 72 which is mounted on trunnions for limited rotation in a vertical plane, and is resiliently held in parallelism with the arm 70 by a spring 73 which loops about a projecting pin 74 and is carried in blocks 75 at the side walls of arm 70, see Fig. 13. The bearing 76 mounts for free rotation a sleeve 77 to one end of which is affixed a pressure disc 78, having a resilient facing, as shown. Disc 78 is preferably of the same diameter as disc 67. Slidably carried within sleeve 77 is a spindle 80 which is urged outwardly of disc 78 by spring 81 until arrested by the stop 79. The head of the spindle is slightly smaller than the conventional spindle aperture of a phonograph record and is tapering or conical so that it will enter said record aperture freely and with relatively small clearance.

Spindle 80 is on a swing radius relative to the bracket 71 suitable to cause its tapered head to enter the tubular end of the shaft 65 when the respective discs 67 and 78 are brought into face to face relationship. When a record 69 is impaled on the spindle and the arm 70 swung into vertical position, said record is clamped between the resilient facings of the concentric discs 68 and 78 and will be rotated as the turntable disc 68 is driven by the motor. The tapered end of the spindle, its permitted rearward movement within its housing, and the pivotal mounting of the bearing 76 permits said spindle to freely enter the shaft 65.

No more than one record is ever carried by the drive disc and spindle, and the drive motor therefore is under constant load in operation, discounting, of course, the slight difference in weight between ten inch and twelve inch records. After a record has been played it is removed from playing position and returned to a record magazine and a new record is brought to playing position substantially coincidently therewith. The removal of the record, the positioning of its successor, and the necessary operations of the tone arm are accomplished by cam and drive clutch assemblies powered by the operation motor 55, as presently described.

The record magazine includes a trough-like floor 82 which is carried by the frame 53 and inclines rearwardly to the sloping rear wall of a chute 83 for delivering the records to proper position for engagement by the support arm 70. The floor-forming structures converge, so that the floor 82 is V-shaped (see Figs. 4 and 5); and intermixed ten and twelve inch records standing thereon will have their spindle apertures in vertical alignment. At the rear of floor 82 there are spaced low walls or stops 84 against which rests the lower edge of the rearmost record in the magazine. Said stops are located to extend along the points of tangency of the respective floor structures and the ten inch or twelve inch record standing thereon. As shown in Fig. 4, there is a relatively wide gap or slot 85 to the rear of the walls 84, and it is through this slot that a released record will pass into the chute.

When the records are stacked within the magazine, the rear faces of the records make an obtuse angle with the plane of the floor members, as shown in Fig. 9. The floor 82 is surfaced with any suitable smooth, resilient material, so that as a record is released from the magazine as later explained, the remaining records will slide rearwardly.

As indicated in Fig. 4, the side walls of the chute 83 are stepped, forming two trackways or channels which are defined by the base and side walls 86, 87 and 88, 90, for the respective accommodation of ten inch or twelve inch records. The vertical center line of the records when stacked in the magazine is in the common center line of the respective channels and since the ten inch channel (defined by the side walls 87) is to the rear of the twelve inch channel, a ten inch record will always drop into the ten inch channel, and the twelve inch channel will intercept the dropping twelve inch record, as said records are released from the magazine floor.

The bottom of the chute 83 has a slot 91 through which the record support arm 70 swings. Cushioned stops 92, 93, respectively at the ends of walls 86, 88, are suitably placed to arrest ten inch and twelve inch records in proper position for impalement by the spindle 80 as the record support arm swings forwardly through the slot 91. If by chance a record should not be picked up by 80 and was pushed away from the chute, it would fall toward the base of the arm 70 and would be caught by the cushion 94 thereon.

Brackets 95 are secured to the underside of the floor 82 and pivotally carry the soft rubber wheels 96 which engage the upper surface of a ten inch or twelve inch record as it traverses the chute, to brake the speed of descent thereof. The wheels are loaded by coil springs 97, the loading effect of which increases as the respective wheel mounts swing outwardly from the rear wall 83. A twelve inch record causes the wheel mounts to swing through a greater arc than a ten inch record, and the resulting increased tension of the springs compensates for the additional weight of a twelve inch record. Each size of record will therefore pass along its channel at approximately the same speed.

The means for retrieving the record after it has been played, and for returning it to the magazine, include a pair of arms 100 extending forwardly from the frame sides 56 and fixedly mounted on a shaft 101 which is journaled in suitable bearings provided on said frame. At their forward ends the arms 100 are joined by a shaft 102 which rotatably carries at its center, the pick-up clamp 103. Said clamp, see Figs. 4 and 11, comprises jaws 104, 105 to the lower ends of which are affixed the cushioned gripping blocks 106, 107, which engage the record as later explained. The upward extremities of the jaws 104, 105 cross each other, scissors fashion, and each jaw structure has pivotally attached thereto one of a pair of U-shaped toggle brackets 108, 110. The legs of said brackets pivotally attach to a shaft having a freely rotatable sleeve 111. Pressure on the sleeve 111 will cause a rotation of the toggle members 108, 110 through an overthrow or dead center position and the jaws 104, 105 will separate as shown in Fig. 1; a suitable spring 109 will be placed under tension thereby. An upward force exerted on the sleeve 111 will cause the jaws to be drawn sharply together to close the clamp jaws smartly. It will be understood that the spring means 109 provides for the snap closure of the jaws and the exertion of sufficient resilient pressure on the record to prevent it from slipping from between the jaws. A spring 112 is anchored on a stud 114 fixed to shaft 102, and to a suitable bracket 115 on the clamp. This spring holds the clamp substantially at right angles to the arms 100 when the clamp has no load.

The spread of the open jaws and the radius of rotation of the arms 100 insures that the clamp jaws will always fit over the record 69 when the latter is to be returned to the magazine.

The closing and opening of the clamp 103 is synchronized with respect to the position of the arms 100. On a plate 116 of one of the side frames 56, there are mounted a cam 117 and a block 118, disposed in the path of a roller 120 fixed to the end of a rod 121 guided for movement adjacent an inner wall of an arm 100. At its forward end the rod 121 carries a pivot block 122 which acts as a driver for a bell crank 123 and is pivotally attached to a leg thereof (see Fig. 4). Said bell crank is pivotally mounted on a bracket 124 fixed to the arm 100. The other leg of bell crank 123 has a rounded end which rides within a groove 125 provided at the end of a sleeve 126 slidably carried on the rod 102. It will be seen therefore that movement of the rod 121 longitudinally of the arm 100 will cause a rotation of the bell crank 123 and a consequent movement of the sleeve 126 to the right or left of Fig. 11, depending upon the direction of movement of said rod. The opposite end of sleeve 126 has another groove 128 within which rides the rounded end of a bell crank 130 affixed to a bracket 131 carried on a collar 132 which is rotatable on shaft 102. Linear movement of sleeve 126 on the shaft 102 will therefore cause rotation of the bell crank 130 to exert either a downward or an upward pressure on the toggle sleeve 111 to which the end of one of the bell crank legs is slidably attached.

The three operational positions of the pick-up arms 100 are the "ready" position shown in Fig. 1 in which the clamp jaws are open to engage a record, the "pick-up" position shown in Fig. 3 in which the pick-up arms have descended to a position where the clamping jaws have engaged a record, and an elevated position which is approximately that shown in Fig. 10 and in which the jaws of the clamp (not shown in Fig. 10) have been opened to release the record to drop into the record magazine. The operation of the clamp is controlled by the movement of the rod 121 as aforesaid, and said rod is driven by engagement with the cam 117 or the cam block 118. With the pick-up arm at the "ready" position of Fig. 1, the roller 120 is not in engagement with either the cam 117 or the block 118. As the arms 100 descend to the pick-up position the roller 120 engages with the surface of block 118 and at the broken line position of Fig. 10, the engagement of the roller with the sloping surface of the block 118 will commence to drive rod 121 forwardly, which will urge the sleeve 126 to the left of Fig. 4. At the dotted line position of Fig. 10, the rod 121 has been driven forwardly sufficient to cause bell crank 130 to rotate clockwise until the toggle sleeve 111 has passed upwardly through the overthrow position and the jaws have snapped to closed position. The record is now gripped by the clamp.

At this point, the support arm 70 will have begun quickly to withdraw from the turntable disc, the operation of said arm and the pickup arms being controlled by a common cam, as later described. The support arm spindle will be clear of the record before upward travel of the record begins.

When the arms 100 are swung upwardly the roller 120 swings away from the block 118 but there is no movement of shaft 121 and the clamp remains closed on the record. The weight of the suspended record rotates the clamp against the tension of the spring 112 so that the record hangs substantially vertically. As the arms swing upwardly to a position where the record is above the magazine platform 82, the roller 120 engages with the underside of the cam 117 and as it approaches the high spot of the cam the roller and its rod 121 are drawn rearwardly, causing a return movement of the sleeve 126 and an eventual opening of the clamp to release the record into the magazine. The clamp jaws remain open, because the toggle linkage has passed through the overthrow position.

The pick-up arms 100 are counterweighted for easy, free movement. To this end there is provided a bracket 134 on each of the arms 100, said bracket pivotally securing one end of a counterweight link 135. The opposite end of said link is pivoted to a counterweight lever 136 pivotally supported on the main frame as shown in Fig. 1. The end of said lever adjustably carries the counterweight 137. It will be understood that there is a similar counterweight assembly for each of the pick-up arms 100.

Means are provided to "sweep" the upwardly swinging record toward the rear of the magazine so that when the clamp releases, the record will stack against the other records. Said means comprise a sweep arm 140 pivotally supported at each side wall of the magazine base as indicated in Fig. 3. The upper extremity of each arm 140 is provided with a bracket which swingably carries a wire gate 141 of sufficient length to extend inwardly across the outer areas of a ten inch record. By suitable means including the springs 142 and stops 143 the gates are normally held to extend across the magazine and are swingable inwardly toward the rear of the magazine as the record passes therethrough, but are restrained against movement forwardly of their respective sweep arms 140. The sweep arms 140 are rotated forwardly and rearwardly by means of the connecting links 144 which are attached to links 145 carried at the ends of the rock shaft 101 for free rotation thereon. A pin 146 on one or both of the links 145 is in the path of rotation of a pin 147 extending from a collar 148 affixed to shaft 101 for rotation therewith. Rotation of pin 147 clockwise of Fig. 3 rotates link 145 outwardly, and link 144 is projected outwardly against the tension of spring 149 by means of which it is anchored to the side frame.

The forward movement of the sweep arms to the broken line position of Fig. 9 corresponds to the correspondingly designated intermediate upward position of the pick-up arms 100, at which point the record 69 has passed through the respective gates 141. The record is thereby held against outward movement. At about the time the record has been released to drop into the magazine the sweep arms 140 are swung rearwardly to urge the record to the rear of the magazine. As later explained, the shaft 101 is oscillated quickly at that stage of operation, the pin 147 withdraws rapidly from pin 146, and spring 149 reacts to swing arms 140 back smartly.

It will be noted that a record is not turned around when it is returned to the magazine. A record having a single playing face would, if the machine were kept in operation, return to the same playing position that it originally occupied; there is no danger of the blank face of the record coming into playing position.

The release of a record from the magazine is also synchronized with and actuated by movement of the pick-up arms 100. The record ejection means includes a lifter 150 which is vertically movable relative to the magazine floor and is normally slightly beneath the surface thereof. The lifter 150 extends between the stops 84 at the rear of the magazine base as shown in Fig. 4, and said stops 84 are so arranged that they support the rearmost record of the magazine so that its lower edge is always above the upper edge of the lifter. Therefore, the stops 84 are offset slightly to the rear of the lifter. Upward movement of the lifter will raise a record so long as the record is held by the stops 84. When stops 84 disengage, the record will slide off of the rearwardly sloping edge of the lifter and into the ten inch or twelve inch chute according to record size.

The lifter 150 is at the end of a lever 151 which is fixed to a shaft 152 mounted in suitable brackets extending downwardly from the magazine floor 82. At the outside of the magazine there is a rock arm 153 secured to the shaft 152 and said arm is connected by means of a link 154 to a lever 155 pivotally mounted on one of the side members of the frame 53, see Fig. 9. The lever 155 has a pivoted latch 156 which is in the path of operation of an arm 157 fixed to and extending downwardly from a collar 158 which rotates with shaft 101. As the shaft 101 rotates to raise the arms 100 the end of lever 157 engages with the latch 156, which is held against clockwise rotation by a stop pin 160 against which the latch is urged by a spring or the like (not shown). The levers 155 and 153 are therefore rotated clockwise of Fig. 9, with rock arm 153 driving shaft 152 and rotating the lifter lever 150 until at a predetermined rotation of the shaft 101 the lifter 150 has raised a record above the stops 84, and the record is ejected from the magazine. As the shaft 101 rotates to return the arms 100 to "ready" position the lever 157 snaps over the end of latch 156 to position it for a succeeding operation.

It should be remembered that there may be a considerable weight of records in the magazine because of the large magazine capacity. In order to relieve the weight on the rearmost record at the instant of release and thereby insure that it will drop into the chute, we provided a pivoted bracket 162 (see Fig. 9) having a relatively soft-surfaced roller 163 against which the rearmost record comes to rest. Said record is therefore supported by the spaced stops 84 and roller 163 in the aforesaid angular relationship with floor 82. The bracket 162 includes a lever 164 which is pivoted on a shaft 165 held in a bearing sleeve 166, secured to the rear frame 57. A spring 167 normally urges lever 164 in rotation counter-clockwise of Fig. 9. Pivotally fixed to the lower end of lever 164 there is a dog 168 having a nose 170' disposed in the path of rotation of a trip 171 mounted on the shaft 101 for rotation therewith. As shaft 101 rotates to lower the arm 100 to record pick-up position, the nose 170 will pass over the trip 171. As shaft 101 reverses its rotation to raise the arms 100, the trip 171 will engage the nose 170 and rotate the lever 164 through a small arc clockwise of Fig. 9, whereupon the roller 163 will urge the stack of records forwardly. At an instant which is coordinated with the movement of the lifter 150 to release a record, the trip 171 snaps over the end of the nose 170 (said trip having a cam-like rear surface, as clearly shown in Fig. 9) and spring 167 thereupon pulls the lever 164 and the roller 163 sharply rearwardly. At the stage of operation of the lifter 150 to release a record from the magazine, the stack of records is unsupported and there is no weight or pressure on the rearmost record which might otherwise have caused it to be clamped against the roller 163 and have prevented its passage from the record magazine.

It will be seen that the operation of the pick-up arms 100 and the mechanism actuated thereby and associated therewith is accomplished by an oscillation of the shaft 101 rather than a complete rotation thereof. Such oscillation is effected during one complete rotation of a cam 175, see Fig. 6, having an internal cam track 176 within which ride a pair of followers as presently described. The cam 175 is driven through suitable gearing from the operation motor 55 as clearly appears in Fig. 2. Suitably supported on a bracket 177 are a pair of mating bevel gears 178, 179, the former being attached to the end of a shaft 180 having at its upper end a gear 181 which meshes with a gear 182 affixed to shaft 101. The gear 179 has affixed thereto an arm 185 the end of which carries a cam follower, such as the roller 186 which rides within the cam track 176. Therefore according to the path of the cam track, the arm 185 will swing in a clockwise or counterclockwise direction, oscillating the gears 178 and 179 to rotate shaft 101 through the arcs necessary to operate the pick-up and record release mechanisms as previously described. The pick-up and release mechanisms operate smoothly and at gradual acceleration during most of their operation phases. Near the point of maximum upward travel of the arms 100, at which point the record is released and the sweep arms 140 swing rearwardly, it is desirable to impart a sharp movement of the arms, and the cam is accordingly given a sharper rise portion, such as 187, shown in Fig. 17b.

Obviously, the operation of the record support arm 70 must be synchronized with the operation of the pickup mechanism and the ejection of a record from the magazine into the appropriate ten inch or twelve inch chute. Accordingly the support arm 70 is also actuated from the cam 175 and there is provided a follower arm 189 suitably pivoted upon a bracket as shown in Fig. 6, said arm having a roller 190 or equivalent riding within the cam track. An arm 191 is pivoted on the same bracket and pivotally secures link 192 pivoted to the support arm 70.

It is a feature of the invention that the operating members concerned with the engagement with or support of the records are swingably or resiliently mounted, or have sufficient internal play to permit the free movement of said members when external pressures or forces are applied thereto. The members, and records carried thereby, are therefore never subjected, during any but abnormal or maliciously imposed conditions, to forces which might damage them.

For example, the arm 70 is freely swingable clockwise of Fig. 1. The respective arms 189 and 191 are mechanically connected by means of a spring 193 which tends to draw the arms together but is restrained by the cooperating stops or blocks 194, 195. Therefore as the follower arm 189 rotates under the urging of the cam track 176, the arm 191 will follow to impart movement to the record support arm, and yet arm 191 may be swung clockwise of Fig. 6 even though the arm 189 is locked against movement independently of the cam track. The arm 70 may therefore be held manually against rotation during operation of the cam 175, or may be manually withdrawn from record clamping position, without possibility of damage.

The sequence of operations controlled by cam 175 is accomplished through a single complete rotation of the cam, which must therefore stop until the next sequence period is at hand. Cam 175 is drivingly connected to a drive gear 198 only for one rotation of the cam. The cam is fixed to a shaft 200 journaled in the spaced brackets 201, 202. Shaft 200 also has affixed thereto a collar 203 from which extends an arm 204 pivotally carrying a pawl 205 for operative association with a ratchet 206 freely rotatable on shaft 200 but keyed to gear 198. A solenoid 207 has an armature 208 pivotally attached to a lever 209 supported in a bracket 210. The forward end of said lever, see Fig. 8, is shaped to pivotally receive a latch 211 extending forwardly thereof, said latch being resiliently supported, as by spring 212. The latch 211 has a gradually sloping nose as shown and with the end wall 214 of lever 209 defines a pocket 215 within which the terminus of arm 204 comes to rest, as later described. It will be obvious from Fig. 8 that the corresponding end of the pawl 205 is not within said pocket 215 but will nevertheless abut the end of wall 214. This gives pawl 205 a limited freedom of movement with respect to arm 204. The engagement of the end of pawl 205 with wall 214 rotates the pawl of the arm 204 sufficiently to disengage the pawl from the ratchet 206, as shown in Fig. 6. A spring 216 normally urges pawl 205 into counterclockwise rotation. When the sequence of operation requires the rotation of cam 175, a switch hereinafter described energizes solenoid 207 causing a counterclockwise rotation of lever 209 sufficient to release the arm 204 and the end of the pawl 205, which by reaction of spring 216 is snapped into engagement with a tooth of the ratchet 206 which is rotating with the gear 198. The solenoid 207 is thereafter deenergized but the arm 204 has by then cleared notch 215 of the lever 209 and the return of said lever to its Fig. 6 position does not interrupt the rotation of the cam 175, which remains drivingly connected by means of the ratchet 206 to the driven gear 198. Just prior to the completion of one rotation of cam 175 the arm 204 engages the sloping nose of the latch 211 camming it downwardly and permitting said lever to reenter the notch 215. The pawl 205 which had immediately previously engaged the end wall 214 is also being rotated clockwise of Fig. 8 to disengage from the ratchet 206, and at the end of one complete rotation of the cam 175, said cam is disconnected from any power source and stops operation.

The tone arm assembly 225 is preferably fabricated from light aluminum stock and has a pair of arms 226, 227 which straddle the record when the latter is in playing position as shown in Fig. 1.

Suitably carried at the ends of the respective arms are the reluctance pick-ups or equivalent 228, 230 as is well understood in the art. Such devices have a stylus or needle which rides within the sound groove and therefore traverse the face of the record. The tone arm assembly is mounted for free movement both perpendicularly of and parallel to the plane of the phonograph record. We prefer to carry the assembly on a rigid post or bracket 231 extending upwardly from the base plate 50, said post having a ball or roller bearing 232 within which freely rides a shaft 233. Said shaft terminates in a fork 234 which embraces the side walls of the tone arm assembly at the base thereof, and is secured thereto in the plane of the center of the tone arm by means of suitable bearings 235. This construction therefore permits the tone arm to rock within its forked supporting member 234 and to rotate relative to the post 231.

The tone arm shaft 233 is counterweighted to make it so freely floating in rotative movement in the plane of the record that the stylus of the arm which is in playing position does not impose any appreciable side pressure on the groove or sound track of the record. The shaft 233 is precisely perpendicular to the plane of the turntable disc and is preferably intermediate the playing area of the record so that there is but a small angle of departure of the tone arm from the vertical from the commencement of play to the finish. The balance of the tone arm is achieved by a counterweight arm 236 affixed to the end of shaft 233, a counterweight 237 being adjustably mounted on said arm.

The plane of the record is in the vertical axis of the side bearings 235 and the tone arm must be rotated on its bearings 235 to bring one or the other of the pick-up cartridges 228, 230 into playing position. Within the base chamber 238 of the tone arm assembly there are secured, in a plane perpendicular to the central transverse plane of the tone arm, the parallel rails 240 upon which ride a shaft 241 having circular discs 242, 243 at the ends thereof. The discs and shaft therefore comprise a shiftable counterweight.

A fork 244 extends through a base aperture 245 and engages the shaft 241. Said fork is pivotally supported on a bearing carried by a bracket 246, said bearing being in the vertical centerline of the tone arm as appears in Fig. 14. The fork 244 terminates in a rounded end portion 247 which rides between the spaced upstanding walls 248, 250 of a shift bracket 251. These walls have arcuate extensions, see Figs. 21 and 22, so that even when the tone arm is swung to its maximum position outwardly of the plane of the record, end 247 will be between the spaced walls.

The shift bracket 251 is supported for slidable movement parallel to the tone arm, as on guide rail 252. Extending downwardly from bracket 251 is a pin 253 which is engaged by the forked end of a shift lever 254 pivoted on the base plate as shown in Fig. 2. Said lever is engaged by an armature or linkage 255 which is common to a pair of normally deenergized solenoids 256, 257, and it will be seen that when one of said solenoids is momentarily energized to attract the armature 255, the lever 254 will be thrown and will cause one or the other of the walls 248, 250 to engage with the lever end 247 and urge the counterweight wheels 242, 243 from one side to the other of the tone arm base, thereby overbalancing the tone arm to bring one of its arms into engagement with the record face. It will be understood that the wheels 242, 243 are relatively light, and are so related to the inherent balance of the tone arm assembly that the tone arm swings gently from one to the other of its angular positions and rests lightly on the playing surface.

It will be obvious that during the interval between the completion of play of one record face and the commencement of play of the succeeding record or record face the tone arm must be operated in synchronism with the pickup of the played record and the placing of the succeeding record or record face in play, as follows:

1. It must be centered to raise the stylus or needle from the played surface, and swung outwardly clear of the record to permit the removal of the record;

2. It must be held in an extreme outward position while the new record is placed;

3. It must be swung toward the center of the record a distance depending upon whether the new record is a ten inch or a twelve inch size so as to engage the record track at the commencement thereof; and 4. One of its arms must be placed against the face of the record which is to be played.

To accomplish steps 1, 2 and 3, we provide the following mechanism:

A post 260 carries a ball bearing or equivalent 261 which slidably journals a shaft 262 concentric with the tone arm mounting shaft 233 and in the plane of the bearings 235. Shaft 262 carries a rigid head 263 having end wall surfaces adjacent the tone arm preferably parallel to the plane of the record. Said wall surfaces are equally above and below the plane of bearings 235. The tone arm wall adjacent head 263 is also parallel to the record. The head has pins 264, 265 which are in mutual alignment and equiradial with respect to shaft 262, and these pins ride within slots provided on the adjacent end wall of the tone arm base as shown clearly in Fig. 21. The slots are elongate so that when the head 263 is withdrawn as later explained neither the head nor the rods 264, 265 will interfere with the rocking of the tone arm on its bearings 235. It should be understood that the rods 264, 265 never disengage from the slots; the head 263 rotates freely with the tone arm as it tracks across the record.

A spring 266 about shaft 262 abuts against the bearing 261 and a collar 267 to urge the shaft to the right of Fig. 14. A shaft 268 is journaled for rotation in post 260 and a post or bracket 270. Mounted on said shaft for rotation thereon is a cam 271 against the side face of which bears the rounded nose 272 of shaft 262. The side face of said cam, see Fig. 2, is planar except for the gradually sloping notch 273 in the path of the nose 272. With the cam 271 at rest, the nose 272 is urged into the notch by the spring 266 and the head 263 is withdrawn relative to the tone arm wall. The end of shaft 262 is seated in the notch 273 all during the playing of the record and at the completion of play the cam 271 is automatically rotated to cause the shaft 262 to climb on the high face of the cam track, urging the planar wall of head 263 against the side wall of the tone arm base, thereby rotating the tone arm on its bearings 235 so that its respective arms 226, 227 are spaced from the record. So long as the nose 272 is not seated within notch 273, the tone arm is held against rotation on its bearings 235.

It will be understood that the stated coplanar relationship of the record, the head 263, and the tone arm side wall is by way of example only; it is only necessary to have such relationship as will produce a rotation of the tone arm on bearings 235 sufficient adequately to bring the respective arms 226, 227 clear of the records.

Carried by the shaft 268 for rotation with the cam 271 are the adjacently positioned, mutually spaced cams 274, 275. Cam 274 is also spaced from cam 271, as by the spacer 276, see Fig. 14. Fixed to shaft 262 for cooperation with the cam 274 is a substantially triangular lever 277 having a roller 278 for engagement with the surface of cam 274. Freely rotatable on shaft 262 is a bell crank 280, one leg 281 of which operates as a follower for the surface of cam 275 and the other leg 282 of which is attached by means of the spring 283 to a latch 284 pivotally carried on lever 277 and engaged by a stop 285 to restrain its rotation in a direction clockwise of Fig. 17.

The shapes of the respective cams 274, 275 and the "at rest" positions of their cam surfaces relative to shaft 262 are shown in Fig. 17a.

The extent of rotation of shaft 262 is the controlling factor for the positioning of the tone arm during the various stages of operation and the rotation of the tone arm (except when the tone arm is engaged with the record and is following the record groove) is under the control of cam 274 and the follower lever 277. The position of the tone arm for a ten inch or twelve inch record is established by the cooperation of the bell crank leg 282 and lugs or stops 288, 290 which project radially from a pivotally mounted bracket 291. Bracket 291 is arranged to be rotated through a short arc by a link 292 affixed to the end of an armature of a solenoid 293, see Fig. 2. The respective stops 288, 290 are offset both laterally and angularly as appears from comparison of Figs. 14 and 15, and their center or rotation is such that when shaft 262 is projected to the left as shown in Fig. 14, arm 282 of crank 280 and the latch 284 of lever 277 will be in the path of whichever stop is in the vertical position shown in Fig. 14, and the said stop will act to arrest the rotation of the shaft 262. The stop 288 being at a greater angular displacement relative to shaft 262 than stop 290 will permit a greater rotation of shaft 263 clockwise of Fig. 15 than the stop 290; hence stop 288 will establish the position of the tone arm for a twelve inch record and stop 290 will fix the position properly for a ten inch record.

Fig. 15 illustrates an intermediate operational stage in which cam 271 has almost completed its rotation. The respective members 282 and 284 are embracing stop 288 and the tone arm is in position for properly commencing play on a twelve inch record. As cam 271 completes its rotation to allow nose 272 to enter the notch 273, shaft 262 will shift to the right of Fig. 14, whereupon the respective cam followers 277 and 281 will shift to the right of their cams 274 and 275 for free swinging without conflict therewith as the tone arm tracks. The members 282 and 284, of course, have withdrawn from the stop 288. Fig. 17a shows this operation position.

The solenoid 293 is controlled by one of two switches 294, 295 which are mounted on the record chute for engagement by either a ten inch or twelve inch record as said record traverses the chute. As clearly appears in Fig. 3, the switches are closed by means of light actuating arms having the respective projections 296, 297 which intercept the record as it passes along the chute and are rotated thereby. As will be later explained, the solenoid 293 is locked electrically so that it remains energized during the full swing of the tone arm even though the switch 294 is but momentarily actuated by the record. Switch 295 is normally closed and its actuation cuts the solenoid out of service. As the device is illustrated and has been constructed, it is therefore necessary to energize the solenoid for ten inch record operation and to deenergize it for twelve inch record operation. It will be understood, of course, that the circuit can be altered so that the reverse of the solenoid operation is true.

The cam 271 is driven for rotation through one complete revolution only, by means of a solenoid actuated clutch similar to that described in connection with the pickup arm cam 175. As shown in Figs. 14 and 18 a suitably journaled shaft 300 which is driven by the operation motor 55 has a bevel gear 301 which meshes with a gear 302 idly rotatable on shaft 268. Secured to the hub of said gear is a ratchet 303. Fixed to shaft 268 is an arm 304 which pivotally carries a pawl 305 having an end 306 which lies along the lower end of said arm as shown in Figs. 18 and 20. A latch lever 307 has a spring-pressed catch 308 which forms a trap for the interception of the end of arm 304 to secure it against rotation. The catch 308 extends forwardly of and partly across the end of lever 307, therefore leaving a wall 309 against which the end 306 of pawl 305 rests to maintain the head of said pawl disengaged from ratchet 303 as shown in Fig. 18. In such position a spring 310 is under tension.

An end of lever 307 is secured to an armature 311 of a solenoid 312 and when the solenoid is energized, lever 307 is rotated clockwise of Fig. 18 to release the arm 304 and pawl 305. The pawl snaps into engagement with ratchet 303 as shown in Fig. 20 and the shaft 268 will be rotated by, and at the speed of, gear 302. As the shaft completes one rotation, the arm 304 snaps over the catch 308 to prevent further rotation, the pawl 305 is disengaged from the ratchet 303, and rotation of cam 271 stops immediately.

The operation of solenoid 312 closes switch 314 which is in the circuit of the operation motor 55. Such closure may advantageously be accomplished by a switch lever 315 which overlies the lever 307 to be rotated thereby as the armature 311 enters the solenoid 312.

As the cam 271 commences its rotation, its first operation is to drive the shaft 262 to the left of Fig. 14 which brings the head 263 against the side wall of the tone arm 225 and enforces a rotation of said tone arm sufficient to straighten the same so that its respective arms are raised from the faces of the record. At this point the tone arm is at the extreme inner portion of the record groove and has rotated sufficiently to bring the members 282, 284 to the right of the line of stop 290 and the shifting of lever 277 and bell crank 280 with the shaft 262 is without conflict with the said stops. As the shaft 262 is shifted to the left into the Fig. 14 position, the cam follower 278 is placed in the path of cam 274 and the cam follower 281 is placed in the path of cam 275. The rotation of cam 274 enforces a clockwise rotation of lever 277 and a corresponding rotation of shaft 262 and head 263 which swings the tone arm outwardly of the periphery of the record.

The head 263 is, in effect, mechanically keyed to the tone arm by means of the pins 264, 265. It will be understood that two pins are employed primarily to maintain balance; one pin would be sufficient to enforce rotation of the tone arm.

As the lever 277 rotates clockwise its latch 284 snaps over whichever of the stops 288, 290 is in operating position. It will be recalled that the bell crank 280 and the lever 277 are tied together by a spring 283, and bell crank 280 would be rotated clockwise with lever 277 if it were not for the cam 275 which engages and rotates the follower 281, driving the crank 280 sufficiently counterclockwise to keep clear of the stop 288. The engagement of follower 281 with the cam surface holds bell crank 280 against rotation enforced by the increasing tension of spring 283 as lever 277 is rotated clockwise of Fig. 17a.

Fig. 17 shows the position of the respective levers 277 and 280 just prior to the rotation of cam 271 sufficient to permit a counterclockwise rotation of said levers and the inward swing of the tone arm to the twelve inch playing position. It will be noted that the spring 283 is under tension and the arm 282 is engaging the stop 288. As cam 271 continues its rotation, the follower 281 will come into the low area 287 of cam 275 but the tension of spring 283 will hold the arm 282 against stop 288. As the cam 271 continues rotation the follower 278 will follow the descending path of cam 274 and the spring 283 will enforce the counterclockwise rotation of lever 277 and correspondingly shaft 262 until the latch 284 engages the opposite wall of stop 288, whereupon the needle on one of the tone arms will be in proper position to be placed against the commencement of the track of a twelve inch record.

As the cam 271 completes its rotation the shaft 268 is driven by the reaction of spring 266 into the low spot 273 of the cam, thereby disengaging the head 263 from the tone arm to permit said tone arm to swing at one side or the other of the record, according to the position of the counterweights therein.

The movement of shaft 262 brings the respective cam followers out of the track path of the cams, and the latch 284 and arm 282 out of the path of the stop 288, so that the tone arm is completely free to track across the record. The suspended weight of the levers 277 and 280 is compensated by the tone arm counterweight 237.

It is desirable at the stage of rotation of the tone arm when it is in position to be placed against the record to prevent accidental swing of the tone arm. To hold the tone arm securely in its ten inch or twelve inch record position at the stage just prior to its release by the head 263 to permit the appropriate tone arm to engage the beginning of the record track as the tone arm swings freely against the record face, there is provided a spring latch 316 which is fixed to and extends from the lever 277 and has a detent face 316a which snaps over the end of the follower arm 281. The detent 316 is spring biased so as to be normally out of the path of arm 281 and we provide a short arcuate cam 316b which projects from the face of cam 271 and which urges the latch end 316a into contact with the arm 281 as the tone arm is brought to ten inch or twelve inch record position. The latched position is shown in Figs. 15 and 16. During the final rotation of the cam 271 the cam 316a disengages from the latch spring 316. To prevent the follower arm 281 from striking the end of the cam 316b as the shaft 262 moves to the right of Fig. 14, the arm may be suitably notched, as shown.

Also journaled in bracket 260 is a cam shaft 317 which carries a gear 318 in mesh with a gear 319 fixed to shaft 258. Gear 319 is half the diameter of gear 318 and therefore shaft 317 will rotate at half the speed of shaft 268. Said shaft operates certain switches, as later described.

The synchronism between tone arm operation and pickup and record release operation is predicated upon the design and relative operating speeds of cams 175 and 271. Comparison of the operating characteristics of said cams, shown in Fig. 17c, should be premised on the fact that cam 175 is driven 50% faster than cam 271, by suitable gear ratios.

Mounted on a suitable control panel are a main switch 60, an "order of play" switch 61, a repeat switch 62 and a reject switch 63. The order of play switch has two three-position gangs 61a, 61b tied together for conjoint operation. Each extreme position sets up the circuit to play a side of each record in succession. Said extreme positions have been designated R and L to denote "right" and "left" sides of the record as viewed, for example, in Fig. 1 in which the tone arm is in position to play the right side of the record. In other words, with the gang switches 61a, 61b set as in the wiring diagram, Fig. 23, the right side of each record will be played in succession. Similarly when the switch 61 is thrown to the opposite extreme the left side of each record will be played in succession. At the center position, designated "N" each side of each record will be played before the succeeding record is introduced to playing position.

The main switch 60 may advantageously comprise a conductive sweep arm 320 to which the "plus" lead of the power source is connected, and three concentric arcuate contacts respectively 321, 322, 323 which are traversed by the sweep arm as the same is rotated clockwise of Fig. 23 to its final or "operation" position at which it is in contact with the end of contact 321.

Associated with the shaft 268 of the tone arm actuator cam are three switches, respectively 325, 326, 327 which are operated by the respective cams 328, 330, 331, see Fig. 14. Switch 325 is a double throw switch, whereas 326, and 327 are single throw switches. Said switches are arranged to be actuated during one rotation of the shaft 268.

Associated with the shaft 317 which is operated from shaft 268 through the 2 to 1 reduction gearing 318, 319, so that said shaft will operate through 180 degrees for each complete rotation of shaft 268, are the switches 332, 333, and 334, the first two being single pole double throw switches and the latter being a single pole single throw switch. The said switches are respectively operated by the cams 335, 336, 337 on the shaft 317.

One of the double throw switches is somewhat schematically shown in Fig. 21 as comprising a central contact arm 333a spring biased for normal contact with fixed contact 333b, but fixed to an insulated rod 333c to be raised to close with contact 333d as said rod rises with the cam follower 333e. Contact 333a will therefore close once with 333d and once with 333e for each full revolution of shaft 317. Single pole switch 334 may be similarly actuated.

Suitably mounted on the base plate 50 is a single pole single throw normally open switch 338 having an arm 340 which will be engaged by the projection 247 of the tone arm as the tone arm swings to the extreme inner portion of a record following the completion of play thereof. The tone arm swing rotates arm 340 to close switch 338, and as the tone arm is swung outwardly of the record the switch 338 reverts to open circuit position.

Assume now that the machine is at rest with the respective switches as shown on the circuit diagram. Rotating switch arm 320 clockwise will energize the tone arm cam clutch solenoid 312 by a circuit which goes from plus power through arm 320, segmental contact 322, conductor 341, solenoid 312 to ground. As the solenoid 312 pulls in, the operation motor 55 is energized by circuit including sweep arm 320, segmental contact 321, conductors 342, 343, 344, switch 314 (now in closed position), and thence through conductors 345, 346 to the motor and ground. The pick-up clutch cam solenoid 207 is energized by a circuit which includes switch arm 320, segmental contact 323, conductor 347, solenoid 207, conductor 348, thence through the normally closed repeat switch 62 to ground.

As the switch arm 320 leaves contact 322 at the end of its rotation, the motor 55 is maintained energized through a second circuit which comprises contact 321, conductors 342, 351, and 352 to switch 326 which, although held open by its associated cam 330 when the shaft 268 is at rest closes as the cam releases the switch arm 353 immediately after said shaft begins rotation, and thence through conductors 354 and 346 to the motor and ground. A record will have been released from the magazine and the record size responsive solenoid 293 will have been energized from switch arm 320, segmental contact 321, conductor 342, thence along conductors 343 to solenoid 293. Assuming that a ten inch record had been ejected from the magazine, switch 294 will have closed and the circuit completed Solenoid 293 brings stop 290 into operating position. As the solenoid 293 energizes, it cuts in a holding circuit comprising conductor 355, normally open switch 356, conductor 357, and the normally closed twelve inch channel switch 295 to ground. If a twelve inch record is the next to be released from the magazine the switch 295 will be opened and the solenoid 293 will be deenergized.

It will be assumed that switch 61 is in the "R" position. Immediately after solenoid 312 is energized by the initial operation of switch 60, a circuit will be made through conductor 342, 351, conductor 358, contact 362 of switch 325 which at the instant of operation of the solenoid 312 is in open circuit position but is engaged by switch cam 328 shortly after shaft 268 begins rotation, then through conductor 360 to the upper throw arm of gang 61b, thence through the R contact and conductor 361 to the solenoid 257 and to ground, it being understood that the solenoid 257 throws the tone arm weights to the left of Fig. 1 and therefore causes the tone arm to rotate in counterclockwise direction to position needle 230 in play.

Suitably after the solenoid 312 has clutched in shaft 268, the cam 328 will release the switch arm 362 to open the circuit of solenoid 257; and the switch arm being biased to close with the opposite pole of switch 325, a circuit will be completed through the opposite pole of said switch, to apply power through conductor 358, switch 325, conductor 363, the second throw arm of gang 61b thence to the lower R terminal through conductor 364 to the record motor 58 and ground. It is to be understood that the application of current through conductor 364 drives the motor in the proper direction for "right hand" record play.

It should be understood that the use of the term "switch arm" includes also what might more properly be called "switch arm actuator," such as the actuators 362, 363 engaged by the cams 328, 330 in Fig. 14. It is also to be noted that in switch 325 the center pole is normally biased to close with its left hand contact, as viewed in Fig. 23, so that when shaft 268 is at rest, the record motor circuit is closed. However, the cam 328 is so arranged with respect to the actuator 362 that very shortly after shaft 268 begins rotation, actuator 362 will be moved to open the record motor circuit and close the tone arm shift circuit. The record motor must be deenergized during the pickup of a played record and the placing of a new one. The latter actions are accomplished in a short space of time because cam 175 rotates through its cycle faster than cam 271, as previously explained. The single throw switch 326 is biased to normally closed circuit position but is held open by the cam 330 at rest.

At the completion of record play the tone arm will be at its most central position on the record, and the swing of the operating arm 247 will close switch 338. Solenoid 312 will be energized through conductors 342, 343, 365, 366 and 341 to apply power to operation motor 55 and institute operation of the tone arm cam to withdraw the tone arm from the record. The pick-up solenoid 207 is energized through switch 338, conductors 366, 341, 370, 372, 373, the bridging arm 374 of gang 61a, and conductors 375, 347, and 348 to the closed repeat switch 62 and ground.

The tone arm will remain at the center area of the record until cam shaft 268 has rotated sufficiently to retract the tone arm. Switch 338 will therefore remain closed for several seconds. This is sufficient to energize solenoid 207 long enough to operate the drive clutch for cam 175 and to hold the switch 314 closed until switch 326 closes to maintain motor 55 in operation.

It will be understood that the respective switches 332, 333, 334 will have been operating during the rotation of the tone arm cam 271 but said switches are ineffective to alter the electrical circuit as is obvious from the circuit diagram.

One may wish to take a record (or one side of a record when switch 61a is in "N" position) out of play before its completion. We provide, therefore, the reject switch 63 which is a normally open momentary contact switch connected to the power line 343 and through conductor 371, 372, 373, the bridging arm 374 of switch gang 61a and conductor 375, 376 to the pick-up arm solenoid 207, the circuit being completed through the conductor 348 and the normally closed repeat switch 62 to ground. The closing of switch 63 also energizes tone arm solenoid 312 through conductors 371, 370 and 341. The operation will then be normal in that the tone arm will be centered and withdrawn from the record and the record pick-up mechanism and record feeding mechanism actuated to remove the unwanted record and place in play the succeeding one from the magazine.

It may also be desired to repeat the play of a record. This is accomplished by opening the repeat switch 62, said switch being of the type which will remain in open or closed position, such as a conventional snap switch. It is apparent that the opening of the repeat switch circuit cuts the pick-up cam arm 207 out of the circuit and the previously played record will remain in play because there is no power in the pick-up and ejection mechanism. The tone arm will close switch 338 to energize solenoid 312 and commence the operation of the power motor 55 for tone arm retraction and replacement on the same face of the same record.

With the gang switch 61 thrown to its central or "N" position, both sides of each record will be played in succession. It is obvious that this requires the properly timed operation of the respective weight shift cams 257, 258 and the proper directional operation of the record drive motor 58. It is also apparent that the tone arm cam solenoid 312 must be energized and the operation motor 55 started at the completion of play of a record face so that the tone arm will be withdrawn and replaced on the opposite face of the same record, and that the pick-up arm solenoid is to be energized only after every second play instead of after every play as previously.

Switches 332 and 333 are single pole double throw switches operated from the respective cams 335, 336 from shaft 317. The cam operation is effective to throw the switch arm from one to the other two poles for each 180 degrees of rotation of said shaft, as previously indicated. Switch 334 is a single pole switch and the cam operation is such that during one half revolution of shaft 317 the switch will be opened, and will be closed when the shaft approaches the end of one revolution. A full rotation of said shaft 317 requires two rotations of the cam shaft 268.

The master switch 60 will power the solenoid 209 and 312 as previously. As is clear from the circuit, power is applied to the switch arm of switch 333 through conductor 358, switch 325, conductor 360 and the upper throw arm of gang 61b, and then through conductor 381 and to whichever of the tone arm solenoids which is represented by the then position of switch 333. As cam shaft 268 rotates, power will be applied to the drive motor through switch 325, conductor 363 and the lower connection of the throw arm of gang 61b thence through the bottom "N" contact, conductor 380, switch 332, to motor 58 and ground.

After play has commenced, the pickup arm solenoid 207 will thereafter be actuated by switch 334 through the bridged "N" positions of gang 61a and conductors 377, 378, 375, 376, and 348. As previously stated, switch 334 closes after each two revolutions of shaft 268.

The tone arm solenoid 312 will be operated by the tone arm switch 338, at the completion of play of a record face.

It will be noted that with the gang switch 61 on "N" position, a single record may be repeated, by which is meant the record will remain in play position and both faces will be played repetitively. If it is desired to repeat the play of but one face of the record, the gang switch 61 must be thrown from the "N" position to the appropriate "L" or "R" position before the repeat switch 62 is opened.

As is noted from the wiring diagram, switch 327 is in series in the circuit between the amplifier and the speaker. The switch actuating cam 331 is so arranged that it opens the switch 327 very shortly after the operation motor 55 is powered and the switch does not close until very shortly before the completion of one revolution of the cam shaft 268. This is effective to cut the speaker out of the circuit during almost the entire running time of motor 55.

An emergency circuit may be provided to open the circuit of operation motor 55 if a record accidentally is released by the clamp 103, or in the event that the support arm 70 did not impale a record on its spindle but pushed it forwardly off the record chute. This emergency cut-out may advantageously comprise a single pole double throw switch 383 mounted on standard 54 and having an operating arm 384 projecting into the path of a falling record as appears in Fig. 3. The switch is normally in closed circuit status in the power line, as shown in Fig. 23, but a falling record which will strike the throw arm 384 will open the power circuit and throw the switch to the opposite pole to complete the circuit through a suitable warning signal S such as a lamp, buzzer, or the like. The fallen record will hold the switch 383 closed, and the warning signal operative, until the operator of the machine retrieves the record, whereupon the power circuit will again be closed for resumption of operation.

Although the invention has been described by making a fully detailed reference to the certain presently preferred embodiments, such detail of description is to be understood in an instructive rather than a limiting sense, many changes being possible within the scope of the claims hereto appended.

We claim:

1. In an automatic phonograph record player, the combination of a turntable for supporting a record for rotation in a vertical plane; a magazine for receiving a plurality of records; means for transporting a record from said magazine to said turntable; means for returning said record to said magazine, comprising a clamp having closable jaw members, arm means for swinging said clamp into record gripping position at said turntable then to record releasing position at said magazine; means for closing and for opening said clamp jaw members at the aforesaid gripping and releasing positions; and means pivotally mounted on said magazine and extending transversely thereof to engage said record and sweep it rearwardly into said magazine as said record is brought toward said magazine.

2. In an automatic phonograph record player, the combination of a turntable for supporting a record in a vertical plane; a magazine for receiving a plurality of records; means for transporting a record from said magazine to said turntable; and means for returning said record to said magazine, comprising a clamp having closable jaw members for gripping a record when in position on said turntable; arm means for swinging said clamp into record gripping position at said turntable and then to record-releasing position at said magazine; means for closing and for opening said clamp jaw members at the aforesaid gripping and releasing positions; a rock shaft for moving said arm members; arm members pivotally mounted at the sides of said magazine, said arm members having relatively light gate means pivotally attached thereto and extending transversely of said magazine in the path of a record being returned thereto, said gate means having a free movement toward the rear of said magazine; and power translation means between said rock shaft and said last-named arm members for swinging said arm members sharply rearwardly of said magazine after a record has passed through said gate means to aid the record toward the rear of the magazine by engagement of the gate means therewith.

3. In an automatic phonograph record player, the combination of a turntable for supporting a record in a vertical plane; a magazine for receiving a plurality of records; means for transporting a record from said magazine to said turntable; and means for returning said record to said magazine, comprising a clamp having closable jaw members for gripping a record when in position on said turntable; arm means for swinging said clamp into record gripping position at said turntable and then to record-releasing position at said magazine; means for closing and for opening said clamp jaw members at the aforesaid gripping and releasing positions; a rock shaft for moving said arm members; arm members pivotally mounted at the sides of said magazine, said arm members having relatively light gate means pivotally attached thereto and extending transversely of said magazine in the path of a record being returned thereto, said gate means having free movement toward the rear of said magazine but not forwardly thereof; and power translation means between said rock shaft and said last-named arm members for swinging said arm members sharply rearwardly of said magazine after a record has passed through said gate means to aid the record toward the rear of the magazine by engagement of the gate means therewith.

4. In an automatic phonograph record player, the combination of a turntable for supporting a record in a vertical plane; a magazine for receiving a plurality of records; means for transporting a record from said magazine to said turntable; and means for returning said record to said magazine, comprising a clamp having closable jaw members for gripping a record when in position on said turntable; arm means for swinging said clamp into record gripping position at said turntable and then to record-releasing position at said magazine; means for closing and for opening said clamp jaw members at the aforesaid gripping and releasing positions; a rock shaft for moving said arm members; arm members pivotally mounted at the sides of said magazine, said arm members having relatively light gate means pivotally attached thereto and extending transversely of said magazine in the path of a record being returned thereto, said gate means having free movement toward the rear of said magazine; and power translation means between said rock shaft and said last-named arm members for swinging said arm members forwardly of said magazine into the path of record movement and then sharply rearwardly of said magazine after a record has passed through said gate means to aid the record toward the rear of the magazine by engagement of the gate means therewith.

5. In an automatic phonograph record player, a magazine for the accommodation of a plurality of phonograph records of different diameters stacked on edge one against the other, said magazine having a rearwardly sloping, smooth surfaced floor of shallow V-shape, whereby records of different diameters will orient themselves with their centers in vertical alignment; a chute communicating with said magazine at the rear thereof; a low stop extending upwardly from each branch of the V-shaped floor to prevent said records from entering said chute; a support member disposed at the rear of said magazine above the center of the largest record accommodated therein, and forming an abutment against which said stack of records leans; a lifter intermediate of and in line with said low stops, said lifter being normally below the edge of the rearmost record in said magazine; means for moving said lifter to raise said rearmost record above said low stops to free the record for release into said chute; and means coordinated with said lifter to propel said support member and thereby supported records forwardly of said magazine as said lifter begins to raise said rearmost record and to withdraw from engagement with said rearmost record to relieve said record of the pressure of the remaining records stacked thereagainst as the lifter raises said record above the first named stop means for passage into said chute.

6. In an automatic phonograph record played, a magazine for the accommodation of a plurality of phonograph records disposed on edge in a rearwardly inclining stack, said magazine having a rearwardly sloping, smooth surfaced floor of shallow V-shape, whereby records of intermixed different diameters will orient themselves with their centers in vertical alignment; a chute communicating with said magazine at the rear thereof; a low stop extending upwardly from each branch of the V-shaped floor and engaging with the rearmost of said records at the lower edge thereof to prevent said record from sliding into said chute; a third stop oscillatably mounted in said magazine above the center of the largest record accommodated therein and providing an abutment against which said rearwardly inclining stack of records rests; means for lifting the rearmost of said records above the said low stops to permit it to drop into said chute, and means for oscillating said third stop quickly rearwardly of said stack of records to disengage therefrom as said lifting means raises said record above said stops.

7. In an automatic phonograph record player, a magazine for the accommodation of a plurality of records of different diameters stacked on edge one against the other, said magazine having a rearwardly sloping smooth surfaced floor of shallow V-shaped, whereby records of different diameters will orient themselves with their centers in vertical alignment; a chute communicating with said magazine at the rear thereof, means including space, fixed stops at the rear edge of said floor, and a movable stop disposed at the rear of the magazine above said floor for holding said stack of records in inclined position relative to said sloping floor; and means for raising the rearmost of said records above said fixed stops and for coincidentally withdrawing said movable stop from said record, to free said record for passage into said chute.

8. In an automatic phonograph record player, a magazine for the accommodation of a plurality of records of different diameters, a chute communicating with said magazine, said chute having a trackway for each size of record contained in said magazine, and along one of said trackways a record released from said magazine will fall by gravity; a roller disposed within the path of travel of a record along any of said trackways to engage the surface of a record passing therealong, said roller being pivotally-mounted relative to said chute and spring biased to resiliently bear against said record to restrain the free fall thereof.

9. In an automatic phonograph record player, a magazine for the accommodation of a plurality of records of different diameters; a chute communicating with said magazine, said chute having a trackway for each size of record contained in said magazine, and along one of said trackways a record released from said magazine will fall by gravity; a roller disposed within the path of travel along any of said trackways to engage the surface of a record passing therealong, means for pivotally mounting said roller for swinging movement toward or away from said chute, and spring means for urging said roller toward said chute to cause said roller resiliently to bear upon a record to restrain the free fall thereof, said trackways being so arranged relative to said roller that the largest diameter record will cause a greater rotation of said roller mounting as said record passes beneath said record than will a smaller record, whereby said spring means will have a greater tension and exert a greater restraining force on said larger record.

10. In an automatic record player, a magazine for receiving a plurality of records, the floor of said magazine comprising rearwardly sloping relatively smooth surfaced members converging downwardly to an apex whereby the centers of all of the records within said magazine are in vertical alignment; a movable support member engaging with the rearmost of said records above the center thereof; spaced, low wall means engaging with the lower edge portion of said rearmost record to form with said first-named support a three element structure for holding said records in said magazine; means for releasing said rearmost record into said chute, comprising a lifter disposed normally beneath the lower edge of said rearmost record, and means for raising said lifter to lift the said record above the wall means to free said record for passage into said chute; and means coordinated with said lifter to disengage said first-named record supporting means from said record at the instant of release of the same into said chute.

11. In an automatic record player, a magazine for receiving a plurality of records, the floor of said magazine comprising rearwardly sloping relatively smooth surfaced members converging downwardly to an apex whereby the centers of all of the records within said magazine are in vertical alignment; a movable support member engaging with the rearmost of said records above the center thereof; spaced, low wall means engaging with the lower edge portion of said rearmost record to form with said first-named support a three element structure for holding said records in said magazine; means for releasing said rearmost record into said chute, comprising a lifter disposed normally beneath the lower edge of said rearmost record, means coordinated with said lifting means to urge said first-named support forwardly and then quickly rearwardly at the instant of release of a record from said magazine to relieve said released record of the weight of the remaining records in said magazine.

12. In an automatic record changer, a turntable for supporting a record for rotation; a magazine for accommodating a plurality of records of intermixed diametrical sizes; a chute for conveying records individually from said magazine to a position adjacent said turntable; an oscillatable arm for transporting a record to said turntable for rotation thereby; a tone arm pivotally mounted for movement parallel to and perpendicularly of the plane of the turntable, said tone arm being balanced for movement toward said record and having means engaging with the sound track thereof to traverse the face of said record upon rotation thereof; cam operated means for raising said tone arm from said record and swinging the same outwardly beyond the periphery thereof; cam operated means for retrieving said record from said turntable and returning it to said magazine; means for releasing a record from said magazine for transport to said turntable; a motor for driving said respective cam means; magnetically operated clutch means for connecting said cam means individually to said motor; means for energizing said motor and operating the clutch of said first named cam means for each traversal of the face of a record by said tone arm; and means including said first-named cam means for operating the clutch of said second cam means only after two such traversals by said tone arm.

13. In an automatic record changer, a turntable for supporting a record for rotation with both faces of the record exposed; a magazine for accommodating a plurality of records; a chute for conveying records individually from said magazine to a position adjacent said turntable; means for transporting a record from said chute to said turntable; a tone arm pivotally mounted for movement parallel to and perpendicularly of the plane of the record, said tone arm straddling the record and having means engageable with the adjacent face of the record to ride within the sound groove thereof and thus to traverse the record; counterbalance means for swinging said tone arm to position one or the other of said tone arm means into engagement with the adjacent sound track; electromagnetically operated means for operating said counterbalance means; cam operated means for raising said tone arm from said record and swinging said tone arm outwardly of said record and then inwardly thereof to place the tone arm in position for a second play; cam operated means for retrieving a record from said turntable and returning it to said magazine; means for releasing another record from said magazine for transport to said turntable; a motor for driving both of the said cam operated means; magnetically operated clutch means for connecting said cam operated means individually to said motor; means for energizing said motor and operating the clutch of said first-named cam operated means for each traversal of the face of a record by said tone arm, and means operated by said first-named cam means for operating the clutch of said second cam means only after two such traversals by said tone arm and operating the tone arm counterbalance magnet after each traversal to swing the tone arm to engage the opposite face of the record.

IRVING D. WALLACH.
GEORGE CLARK.

REFERENCES CITED

The following references are of record in the file of this patent:

UNITED STATES PATENTS

| Number | Name | Date |
|---|---|---|
| 1,727,731 | Reade et al. | Sept. 10, 1929 |
| 1,868,846 | Oysten | July 26, 1932 |
| 1,892,626 | Oysten | Dec. 27, 1932 |
| 2,007,054 | Jones et al. | July 2, 1935 |
| 2,064,868 | Yeider | Dec. 22, 1936 |
| 2,175,142 | Andres | Oct. 3, 1939 |
| 2,263,643 | Offen | Nov. 25, 1941 |
| 2,281,548 | Andrews | May 5, 1942 |
| 2,323,365 | Andrews | July 6, 1943 |
| 2,348,766 | Wagner et al. | May 16, 1944 |
| 2,357,520 | Kahl | Sept. 5, 1944 |
| 2,368,086 | Becwar | Jan. 30, 1945 |
| 2,376,741 | Weaver | May 22, 1945 |
| 2,387,916 | Knox | Oct. 30, 1945 |
| 2,458,496 | Andrews | Jan. 11, 1949 |